US006232539B1

(12) United States Patent
Looney et al.

(10) Patent No.: US 6,232,539 B1
(45) Date of Patent: *May 15, 2001

(54) MUSIC ORGANIZER AND ENTERTAINMENT CENTER

(75) Inventors: Brian M. Looney, Lexington, MA (US); Dale R. McMullin, Parker, CO (US); Joseph Pasciuto, Bellingham; Edward T. Doyle, Westford, both of MA (US)

(73) Assignee: Looney Productions, LLC, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,559

(22) Filed: Oct. 18, 1999

Related U.S. Application Data

(63) Continuation of application No. 09/098,843, filed on Jun. 17, 1998, now Pat. No. 5,969,283.

(51) Int. Cl.[7] .......................... G09B 5/00; G09B 15/04; G10H 1/46

(52) U.S. Cl. .......................... 84/609; 84/633; 84/639; 84/478; 434/307 A

(58) Field of Search .................. 84/601, 602, 609–614, 84/633–640, 477 R, 478, DIG. 6; 434/307 R, 307 A; 380/19–21, 23–25, 30, 49, 50, 53, 269; 705/52, 57

(56) References Cited

U.S. PATENT DOCUMENTS

| | | | |
|---|---|---|---|
| 3,947,882 | 3/1976 | Lightner | 360/92 |
| 4,227,220 | 10/1980 | Brown et al. | 360/15 |
| 4,703,465 | 10/1987 | Parker | 369/30 |
| 4,851,931 | 7/1989 | Parker et al. | 360/15 |
| 4,937,807 | 6/1990 | Weitz et al. | 369/85 |
| 5,408,630 | 4/1995 | Moss | 395/425 |
| 5,418,713 | 5/1995 | Allen | 364/403 |
| 5,445,295 | 8/1995 | Brown | 221/3 |
| 5,486,645 | 1/1996 | Suh et al. | 84/610 |
| 5,502,601 | 3/1996 | Scheffler | 360/32 |
| 5,508,984 | 4/1996 | Goto | 369/47 |
| 5,510,573 | 4/1996 | Cho et al. | 84/610 |
| 5,557,541 | 9/1996 | Schulhof et al. | 364/514 |
| 5,581,795 | 12/1996 | Maupin et al. | 395/882 |
| 5,592,511 | 1/1997 | Schoen et al. | 375/220 |
| 5,610,774 | 3/1997 | Hayashi et al. | 360/15 |
| 5,610,893 | 3/1997 | Soga et al. | 369/84 |
| 5,611,607 | 3/1997 | Kuzara et al. | 312/9.14 |
| 5,616,876 | 4/1997 | Cluts | 84/609 |
| 5,619,425 | 4/1997 | Funahashi et al. | 364/514 |
| 5,625,608 | 4/1997 | Grewe et al. | 369/24 |
| 5,633,839 | 5/1997 | Alexander et al. | 369/30 |
| 5,648,628 | 7/1997 | Ng et al. | 84/610 |
| 5,670,730 | 9/1997 | Grew et al. | 84/609 |
| 5,679,911 | 10/1997 | Moriyama et al. | 84/601 |
| 5,696,965 | 12/1997 | Dedrick | 395/610 |
| 5,734,119 | 3/1998 | France et al. | 84/622 |
| 5,734,719 | 3/1998 | Tsevdos et al. | 380/5 |
| 5,739,451 | 4/1998 | Winsky et al. | 84/609 |
| 5,740,134 | 4/1998 | Peterson | 369/30 |

*Primary Examiner*—Stanley J. Witkowski
(74) *Attorney, Agent, or Firm*—Cesari and McKenna, LLP

(57) ABSTRACT

A music organizer and entertainment center provides a center having a microprocessor, sound card functions and high-volume data storage and retrieval units for playing back music according to a variety of predetermined categories. Music can be played back in random form or can be played back according to a particular pre-selected order. The categories are provided by service provider who delivers selected titles and/or songs to the end user. The songs are typically loaded using a custom CD-ROM provided from the service provider. The music is provided in data-compressed form and is decompressed and processed through a sound card during playback. The categories can include a variety of parameters such as title, artists, date, speed, dance characteristics, subjective energy level and music style, such as easy-listening, upbeat, etc.

18 Claims, 27 Drawing Sheets

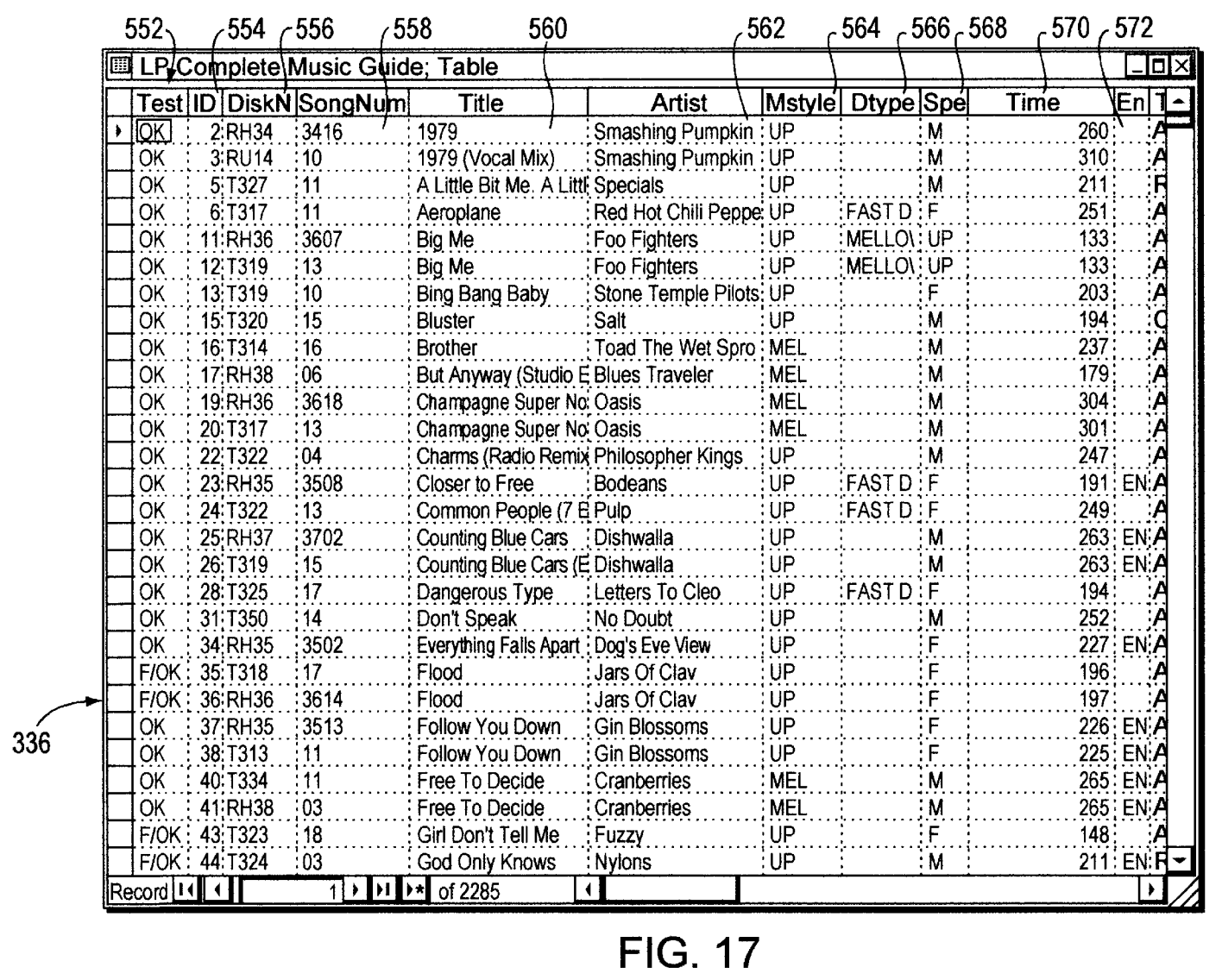

552 554 556 558 560 562 564 566 568 570 572

LP Complete Music Guide; Table

| Test | ID | DiskN | SongNum | Title | Artist | Mstyle | Dtype | Spe | Time | En | T |
|---|---|---|---|---|---|---|---|---|---|---|---|
| OK | 2 | RH34 | 3416 | 1979 | Smashing Pumpkin | UP | | M | 260 | | A |
| OK | 3 | RU14 | 10 | 1979 (Vocal Mix) | Smashing Pumpkin | UP | | M | 310 | | A |
| OK | 5 | T327 | 11 | A Little Bit Me. A Littl | Specials | UP | | M | 211 | | R |
| OK | 6 | T317 | 11 | Aeroplane | Red Hot Chili Peppe | UP | FAST D | F | 251 | | A |
| OK | 11 | RH36 | 3607 | Big Me | Foo Fighters | UP | MELLO\ | UP | 133 | | A |
| OK | 12 | T319 | 13 | Big Me | Foo Fighters | UP | MELLO\ | UP | 133 | | A |
| OK | 13 | T319 | 10 | Bing Bang Baby | Stone Temple Pilots | UP | | F | 203 | | A |
| OK | 15 | T320 | 15 | Bluster | Salt | UP | | M | 194 | | C |
| OK | 16 | T314 | 16 | Brother | Toad The Wet Spro | MEL | | M | 237 | | A |
| OK | 17 | RH38 | 06 | But Anyway (Studio E | Blues Traveler | MEL | | M | 179 | | A |
| OK | 19 | RH36 | 3618 | Champagne Super No | Oasis | MEL | | M | 304 | | A |
| OK | 20 | T317 | 13 | Champagne Super No | Oasis | MEL | | M | 301 | | A |
| OK | 22 | T322 | 04 | Charms (Radio Remix | Philosopher Kings | UP | | M | 247 | | A |
| OK | 23 | RH35 | 3508 | Closer to Free | Bodeans | UP | FAST D | F | 191 | EN | A |
| OK | 24 | T322 | 13 | Common People (7 E | Pulp | UP | FAST D | F | 249 | | A |
| OK | 25 | RH37 | 3702 | Counting Blue Cars | Dishwalla | UP | | M | 263 | EN | A |
| OK | 26 | T319 | 15 | Counting Blue Cars (E | Dishwalla | UP | | M | 263 | EN | A |
| OK | 28 | T325 | 17 | Dangerous Type | Letters To Cleo | UP | FAST D | F | 194 | | A |
| OK | 31 | T350 | 14 | Don't Speak | No Doubt | UP | | M | 252 | | A |
| OK | 34 | RH35 | 3502 | Everything Falls Apart | Dog's Eve View | UP | | F | 227 | EN | A |
| F/OK | 35 | T318 | 17 | Flood | Jars Of Clav | UP | | F | 196 | | A |
| F/OK | 36 | RH36 | 3614 | Flood | Jars Of Clav | UP | | F | 197 | | A |
| OK | 37 | RH35 | 3513 | Follow You Down | Gin Blossoms | UP | | F | 226 | EN | A |
| OK | 38 | T313 | 11 | Follow You Down | Gin Blossoms | UP | | F | 225 | EN | A |
| OK | 40 | T334 | 11 | Free To Decide | Cranberries | MEL | | M | 265 | EN | A |
| OK | 41 | RH38 | 03 | Free To Decide | Cranberries | MEL | | M | 265 | EN | A |
| F/OK | 43 | T323 | 18 | Girl Don't Tell Me | Fuzzy | UP | | F | 148 | | A |
| F/OK | 44 | T324 | 03 | God Only Knows | Nylons | UP | | M | 211 | EN | F |

Record 1 of 2285

336

FIG. 17

MUSIC ORGANIZER AND ENTERTAINMENT CENTER

RELATED APPLICATIONS

This is a continuation of U.S. patent application Ser. No. 09/098,843, filed Jun. 17, 1998 now U.S. Pat. No. 5,969,283.

This application includes a Microfiche Appendix pursuant to 37 CFR 1.96(c) that contains a computer program listing of program commands in the commercially available Visual Basic language for implementing various functions of one embodiment of the center of the present invention described herein. The total number of microfiche and the total number of Frames in the Microfiche Appendix are 2 and 103, respectively. A portion of the disclosure of this patent document or patent disclosure contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to music recording and playback systems, and more particularly to a system that enables storage and playback of a wide range of individual music selections/songs according to a pre-programmed list of categories.

BACKGROUND OF THE INVENTION

The storage of music on digital media has presented a number of opportunities to miniaturize storage devices for music, thus enabling larger amounts of music to be stored in one place, and to radically alter the presentation of this music. In addition to the actual music sound data, new data related to certain characteristics of the music can now be overlaid in the storage media. This enables a listener to organize and playback music in a highly customized manner. It is no longer strictly necessary to store music in one format (e.g., a single disc or record) and playback individual selections from this disc or record according to a strict organization scheme. Likewise, advances in data compression and storage technology have enabled much larger quantities of digital data to be stored on magnetic disc and optical media than previously. The "Red Book" format common to music compact discs is somewhat inefficient due to its slow sample rate, and a much larger amount of data can be compressed on a standard data optical disc (CD-ROM), and decompressed and replayed using any number of readily available playback software routines.

In addition, most computers and data processing devices are now equipped with multimedia programs and advanced high-fidelity sound.

It is, therefore, an object of this invention to provide a music organizer and entertainment center that takes advantage of the latest advances in music data compression, storage and data processing capabilities. It is a further object of this invention to provide a user with the ability to fully customize playback of music according to a variety of parameters including categories of music. The graphical presentation of playback and storage controls should be easy to use and learn, and should take advantage of color and other visual aids.

SUMMARY OF THE INVENTION

This invention overcomes the disadvantages of the prior art by providing a music organizer and entertainment center that enables customized playback of music having a variety of predetermined categories that are provided, typically, ahead of time by a service provider. Music is played back in any desired order based upon those categories from an onboard database that can include a large number of songs or titles.

The music organizer and entertainment center provides a center having a microprocessor, sound card functions and high-volume data storage and retrieval units for playing back music according to a variety of predetermined categories. Music can be played back in random form or can be played back according to a particular pre-selected order. The categories are provided by service provider who delivers selected titles and/or songs to the end user. The songs are typically loaded using a custom CD-ROM provided from the service provider. The music is provided in data-compressed form and is decompressed and processed through a sound card during playback. The categories can include a variety of parameters such as title, artists, date, speed, dance characteristics, energy level and music style.

The user selects between a variety of graphical user interface screens that are arranged on a display. The display can comprise a touch screen, or can include a variety of cursor-moving functions for operating different display "buttons" defined on the screen. Alternatively voice recognition software can be used to provide a voice operation capability to the user. Likewise, voice synthesis can be used to inform the user of various system operations.

The interface can be organized according to various music categories that each appear as buttons. Within each button can be contained sub-categories for further organization. All categories are cross indexed with categories that are predefined within various fields of the database, that stores the data for each song in an appropriate file having the various category flags appended thereto. Conventional database software such as Microsoft Access® can be used in forming the database for compressed music data and categories. The music is preferably compressed using MPEG3 and a standard sound card, typically having high-fidelity characteristics is used to playback the decompressed music. The music is stored in a hard drive or other high-volume storage medium on the system in compressed form. Compression of the music, as well as loading of appropriate category flags is accomplished at the service provider's facility based upon the user's orders. Orders can be taken and filled electronically, via the Internet. Alternatively, oral orders can be made, that are filled by preparing a CD-ROM containing the selected songs in compressed form. A master list can be contained on the database of the users' system. This master list can be used to select the various songs from the service provider. the CD-ROM can include updates to the master list that are loaded along with the songs.

The CD-ROM and/or individual songs can include a special code or identification that is keyed to the user's system's code. In this manner only the user's system can load the songs on its hard drive. A docking mechanism can be provided to all or part of the system to allow songs to be moved to different playback devices. In this manner the user can have a library of songs to playback in a variety of portable and fixed base units including vehicles.

One of the categories provided to selections can be ratings. Ratings are typically provided ahead of time by the service provider and are appended to the overall database of categories. The user has, in the center, a facility for blocking out any songs from being listed or searched that exceed a predetermined rating category. A password is used to control the block-out function. This password is initially entered by the user or is provided ahead of time by the service provider. It must be entered in order to control the block-out function.

The center can also be provided with an auto exit function. When an initial screen is called, the user can indicate how many minutes he or she wishes the center to playback songs. When that number of minutes has elapsed, the center automatically shuts off.

It is contemplated that with appropriate data storage techniques and playback facilities, the center can organize video and image data as well as music data. Particular video data compression and playback hardware and software are typically required for such playback.

BRIEF DESCRIPTION OF THE DRAWINGS

The foregoing and other objects and advantages of the invention will become more clear with reference to the following detailed description, as illustrated by the drawings in which:

FIG. 17 is a plan view of a forth graphical user interface screen;

DETAILED DESCRIPTION OF AN ILLUSTRATIVE EMBODIMENT

Figure 1:
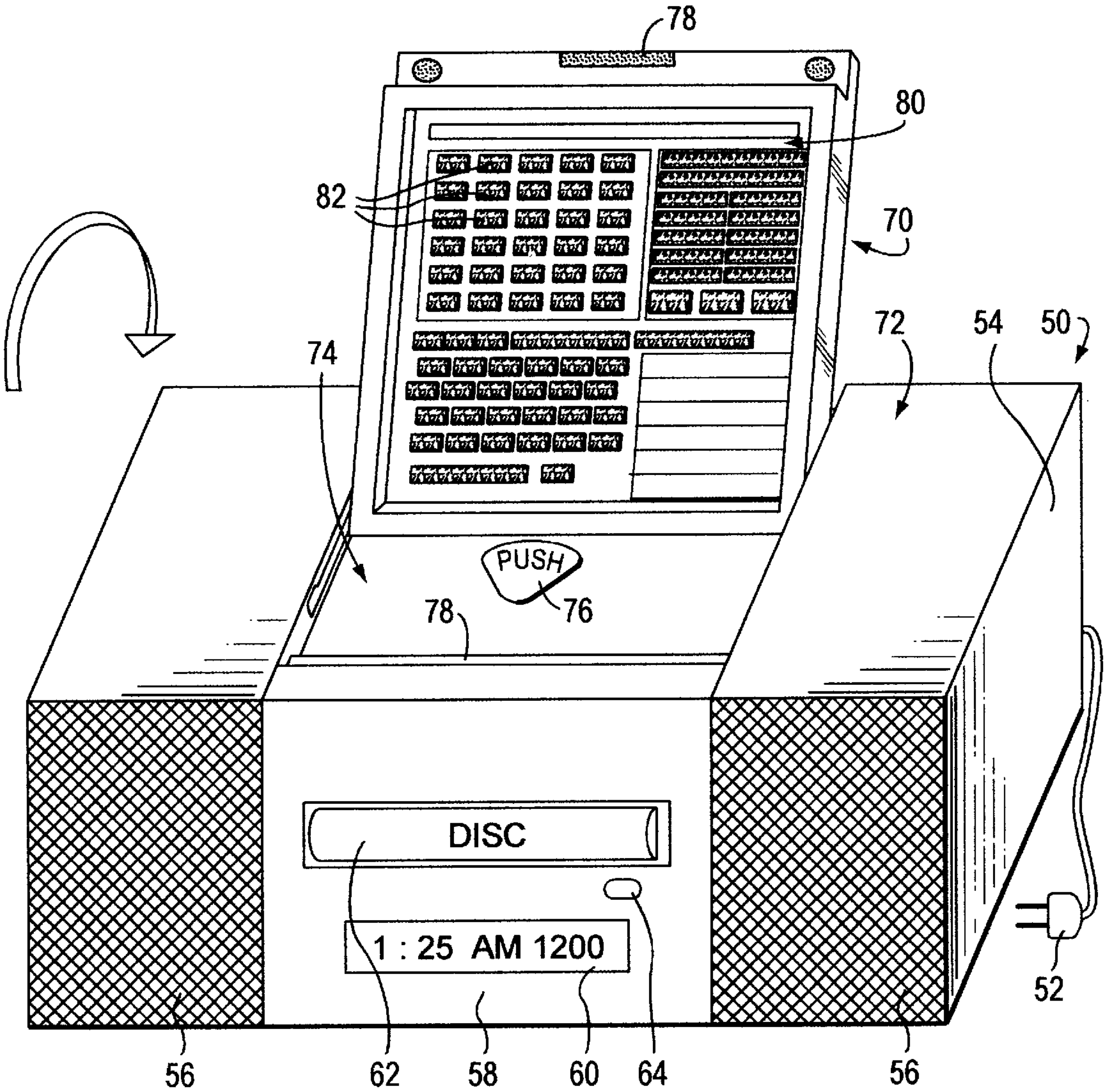
FIG. 1 is a perspective view of an exemplary music organizer and entertainment center according to an embodiment of this invention.

A generalized embodiment of a music organizer and entertainment center 50 is detailed in FIG. 1. For the purposes of this description the term "center" will be used to describe any of the music organizer and entertainment center systems described herein. The center 50 is a stand-alone unit powered by household current using a conventional power cord 52. According to a basic embodiment it can be a personal computer, as evidenced by the conventional components to be described below. Alternatively it can be a custom unit as also described below. The chassis 54 of the center includes at least two integral speakers 56 to provide stereo sound. A variety of horn-folding and acoustic enhancement techniques can be used to increase the performance of the speakers. Alternatively, separable speakers can be used, placed at remote locations in a room. The front panel 58 of the center can include a variety of knobs, switches and displays. In this embodiment, a basic LCD display 60 is shown and a retractable tray mechanism for receiving an optical data or music compact disc is also provided 62. This tray 62 is conventional according to this embodiment, extending outwardly and retracting inwardly based upon a switch 64. The transport mechanism and reading mechanism can be conventional. The center includes a flip-up type display 70 according to this embodiment. The display is located on the top 72 of the center and is retractable into a recess 74. A large button 76 is provided to support the display 70 in an upright position. This button can be springloaded. When it is pushed downwardly, it allows the display to be adjusted into different position. A latch mechanism 78 can be provided to the display 70 and to the recess 74. The latch mechanism allows the display to be locked into a close position, or, alternatively, released for deployment as shown. The display, itself, includes a screen 80 having any acceptable size, format and display technology. For example, a color active-matrix screen, such as that found in a laptop computer can be used. The pixel dimensions are generally comparable to those of a laptop computer display. The display itself includes a graphically user interface with a series of displayed graphical user interface "buttons" 82 that can be actuated using a touch-screen layer applied to the display 80. The touch-screen hardware and controller software are conventional and commercially available. Alternatively, a mouse or other cursor-moving mechanism, such as a track ball, can be provided to the chassis 54.

Figure 2:
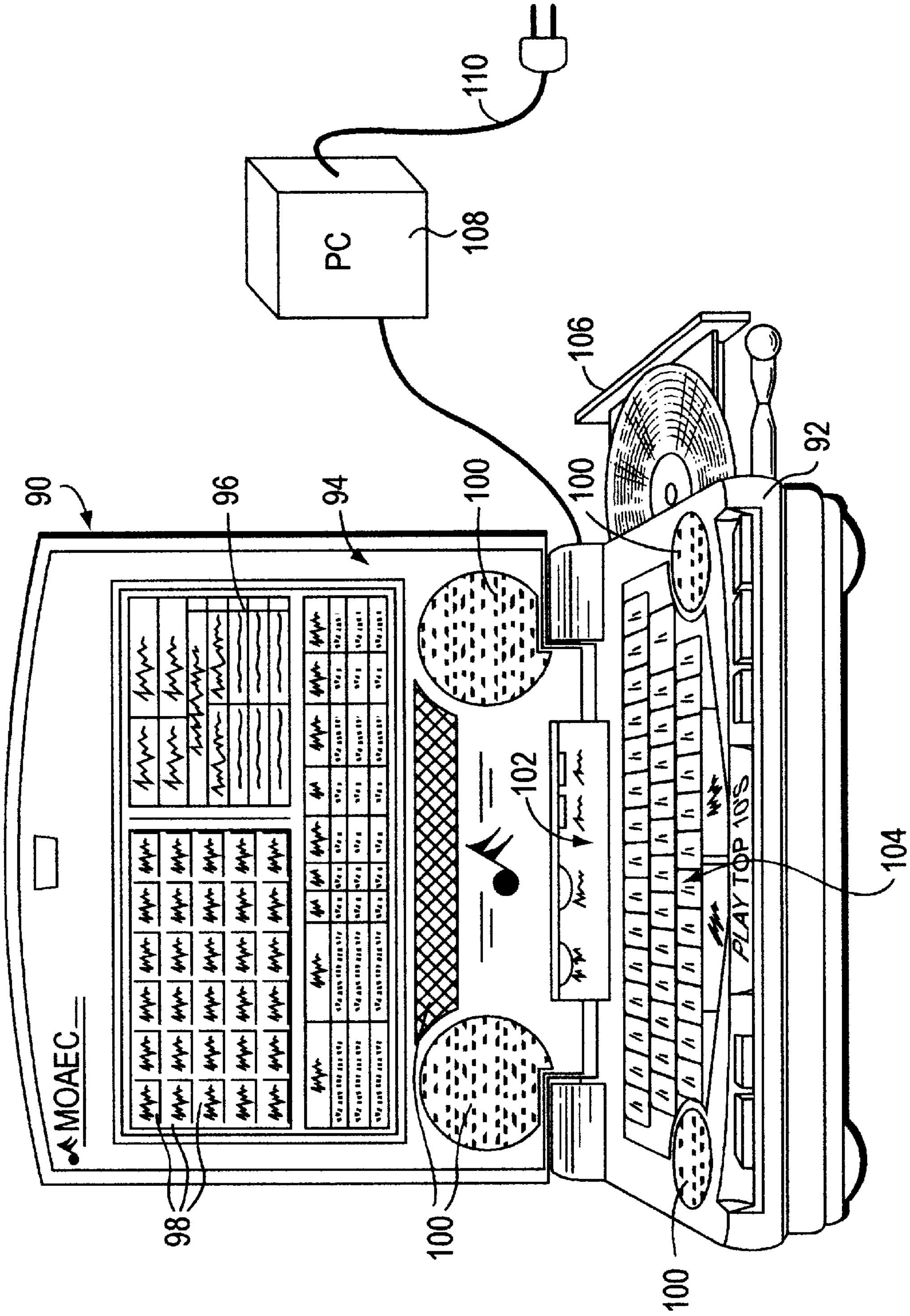
FIG. 2 is a perspective view of an exemplary music organizer and entertainment center designed for portability according to an alternate embodiment of this invention.

With reference to FIG. 2, an alternate embodiment of a center 90 is detailed. This center comprises a laptop arrangement having a base 92 and a foldable display section 94. This center can comprise, in essence, a modified laptop computer with all the basic components of a modern multimedia computer system. Certain personal computer components not specifically required for the purposes of this embodiment can be omitted. For example, a display 96 having buttons 98 as described above can be provided. A plurality of speakers 100 can also be provided representing base, midrange, tweeters, etc. Volume and screen display controls 102 can also be provided as well as a basic alphanumeric keyboard 104 of conventional design. A retracting compact disc tray and reader 106 can also be provided. An onboard battery (not shown) provides power while an AC/DC converter 108 recharges the unit based upon household current provided by a power cord 110. Note that automotive DC current can also be used.

Figure 3:
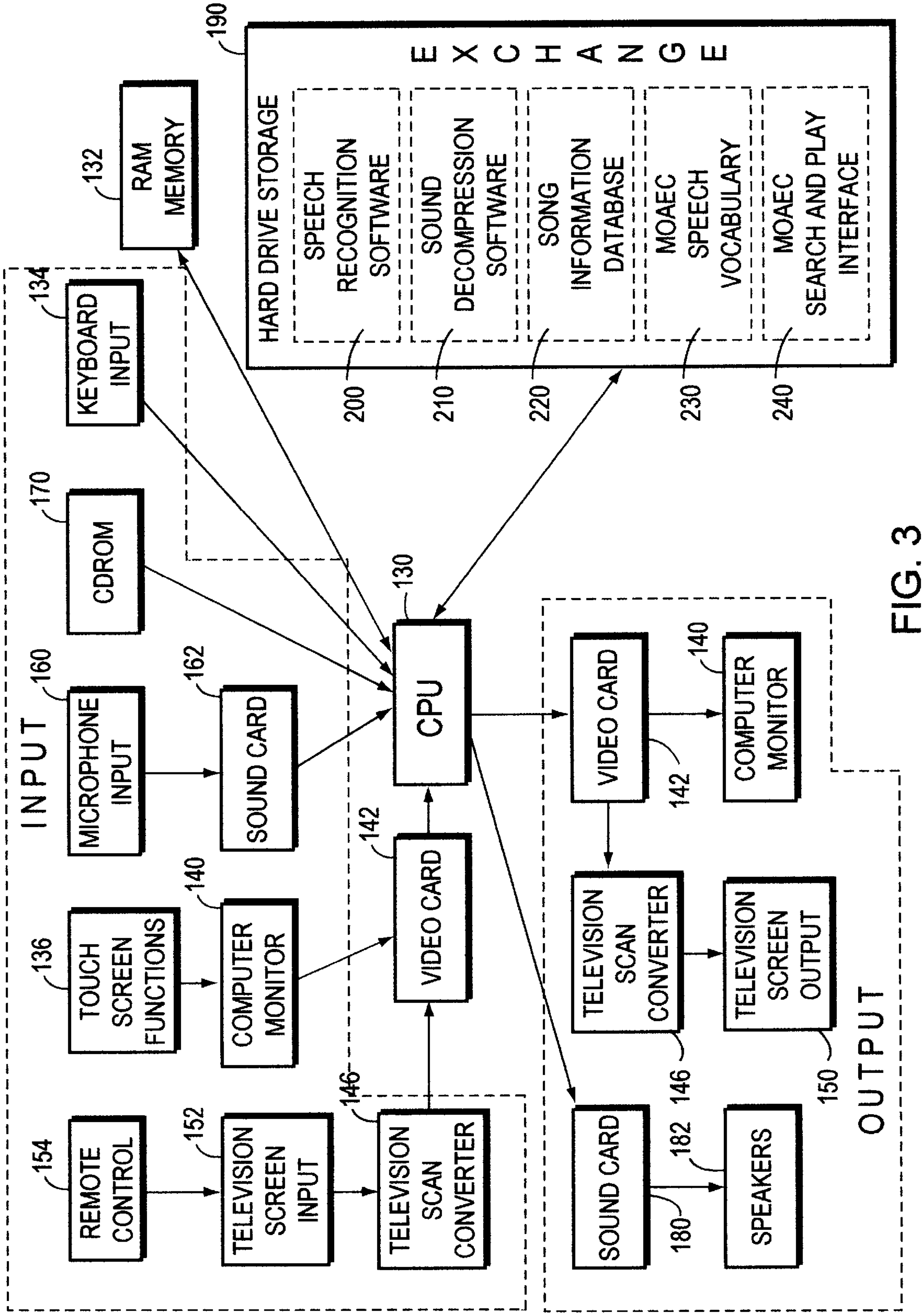
FIG. 3 is a schematic block diagram of the hardware architecture of an exemplary music organizer and entertainment center.

The generalized architecture of a center is further detailed in FIG. 3, complete with optional components. The "heart" of the center is its central processing unit or CPU 130. The CPU, in a preferred embodiment comprises a Pentium® II microprocessor having an operating speed of 266 MHz or greater available from Intel. The architecture of this microprocessor is well-known. It is adapted to accept inputs from a variety of hardware components. These hardware components are, themselves, commercially available and can be interfaced with the CPU 130 by those of ordinary skill. In summary, the components involved in a complete center will now be described.

A random access memory (RAM) 132 is provided to support the CPU 130. This RAM typically provides twenty megabytes of storage or greater. A keyboard and/or cursor-moving mouse interface is also provided. The keyboard 134 can be omitted in certain embodiments where a touch-screen is used for all onboard functions. For example, the touch-screen, shown as a touch-screen interface 136, and used in conjunction with the monitor screen 140, can include a touch-keyboard thereon for entering alphanumeric characters. Where a monitor 140 is used, a video driver card 142 of conventional design is provided. A conventional television can also be utilized. Where a television screen is used for displaying data, a scan converter 146 can be provided. The scan converter 146 can be used for output 150 to the television screen and/or input 152 from, for example, a television remote control 154. In this manner both input and output via a television and/or computer monitor can be accomplished. A microphone 160 and appropriate voice recognition card 162 can also be provided in conjunction with the CPU. Additionally, a CD-ROM, with appropriate driver card 170 can also be provided. For output, a sound card, available from a variety of commercial sources such as the Soundblaster® driver 180 can be employed and appropriate amplifiers and speakers 182 can be provided. The amplifiers and speakers are conventional and receive inputs from the sound card in the form, typically, of analog audio signals.

Input/output exchange of data is provided through a hard drive storage 190, also of conventional design. As will be described further below, the hard drive storage interacts with the CPU 130 using onboard software. This software includes a speech recognition software block 200 a sound decompression software block 210, a sound information database 220 the center's proprietary speech vocabulary 230 and the center's search and play interface 240.

A significant feature of the center, to be described in greater detail below, is the organization of individual songs or selections according to specific categories, that are determined ahead of time, on a partially subjective basis, by the service provider. These categories are carried in a database, along with the raw digital music data, and allow the user to playback each of the individual selections based upon specific categories in a random or ordered manner. The use of categories for storage and playback empowers the user in an entirely new way. Songs can be chosen based upon a specific desire or mood that relates to categories such as music age, energy, speed, style, dance, or rating. Experienced listeners can enjoy new convenience in music playback. Newer listeners typically find their use of the center to be highly educational, as they quickly learn to associate certain types of categories with specific selections, artists and songs, and can enjoy the benefit of a full display of the song data via the center's screen.

With reference to the above-described architecture, the procedure by which individual songs become categorized and eventually made available for a user to playback according to particular categories will be described in summary:

1. Musical source material is first purchased or otherwise acquired by the service provider that services the music organizer and entertainment center of this invention. This music is typically obtained in standard Red Book compact disc format on individual music albums and singles.

2. A standard compact disc player, DAT or other audio playback medium is used by the service provider in conjunction with a main computer having a large database. A hard drive rated at five gigabytes or larger is used in conjunction with the database.

3. Music is played by the playback device into a data compression card commercially available from, for example, Dialog Four™. This data compression card compresses the music into the commercially available MPEG3 format. A CPU, similar to that shown in FIG. 3 stores the music in the hard drive of the service provider in compressed form. Individual songs are each given their own file identifier for later processing.

4. Compressed music is subsequently catalogued using a conventional database program such as Microsoft Access® 2.0 in this embodiment. The following categories, among others can be used in conjunction with the database program to catalog each individual musical selection-song title, artist, date, main music category, sub-main music category, special music category, sub-music category, music style, dance type, music speed and a subjective music "energy level" determined by the service provider. These categories are used subsequently by the center's operating system as described below. All categories are stored in the service provider's hard drive for subsequent retrieval.

5. A master list of available music, in the form of individual selections or songs, is complied by the service provider. Individual customers or subscribers are solicited to select songs or groups of songs or selections from a service provider. According to a preferred embodiment, the selected songs are copied from the service provider hard drive to is a writable data compact disc in MPEG3 compressed format. The center operating system software and Access® 2.0 database program available from Microsoft, Inc. of Redmond, Wash. can also be loaded unto this compact disc when the playback device does not already contain these software packages.

The package of data compressed songs and other software if applicable, is tagged with a distinct serial number or other identifier and/or format that matches a pre-loaded serial number or format in the subscriber's particular center. This serial number or format has been pre-loaded in the center from software made available by the service provider. For example, a commercially private or public key encryption algorithm can be provided to the subscriber. The data in the compact disc includes an appropriate encryption key that matches one already present in the center. Compressed data can be decrypted and "unlock" based upon a match between the key provided by the service provider and the key provided by the center. In any case, a technique for locking information so that only a desired center can read the information and, hence, play the songs, is provided. This prevents copyright infringement and unauthorized playback of songs by other units that have not paid appropriate license fees for receiving the music.

6. As noted above, a formatted, data-compressed disc is provided to the subscriber via a physical transfer of the disc. In other words, the disc is mailed or otherwise delivered to the subscriber. It should be noted that, while an optical disc is the preferred form of data transfer according to an embodiment of this invention, another form of storage media such as tape, circuit chips, removable hard drive, or any other acceptable high-volume data storage can be used to transfer song data. Likewise, the formatted compressed data can be transferred via a radio or telephone network link, naturally including various file transfer techniques using the well-known Internet, assuming that appropriately wide bandwidths is available to enable the transfer to occur in a sufficiently short period of time. All these techniques of transferring formatted, compressed, customized song data are expressly contemplated according to this invention. It is desired primarily that the data include various categories as described above with reference to step 4.

When the subscriber receives the customized song data on the disc or other medium, the customer installs the disc in his or her center by following conventional installation and instructions provided with the disc. As noted, the center either includes well known CD-ROM installer routines, such as those found in popular Windows® operating system available from Microsoft or, alternatively, specialized installation software is included with the disc transferred from the service provider. All data on the disc is typically transferred into the high-volume hard drive or other storage media provided with the center. The song data, therefore, resides in the center formatted in the Access® 2.0 database as described above. The categories appended to each song as part of the database program also reside in the center's hard drive at this time.

7. The center's software loads data related to individual song selections and categories into appropriate database locations.

8. The center polls data in the downloaded disc to determine whether the appropriate identification code and/or serial number, matching that of the center is present. If not, then the downloading process in terminated, and the user is advised to contact the service provider.

9. If downloading of song data is completed successfully, then the data becomes resident on the center's disc drive or other high-volume random access memory storage unit. New songs are appended to a list that contains any previous songs. This information is displayed in a manner to be described further below.

10. The CD-ROM is subsequently removed from the center and stored for backup purposes. At this time, the user can select various songs downloaded in the previous steps using various graphical user interface and/or voice commands to be described further below.

11. Upon playback, song data is decompressed from its stored format using MPEG3 data compression. The decompressed song data is then played in a standard "wave" format using, for example, Winplay 3® available from Microsoft, or another data-to-sound software procedure. It is contemplated that the software procedure be compatible with an appropriate sound card, as described above. Speakers and an amplifier are used to deliver music to the user, as also described above.

Reference will now be made to the flow diagrams illustrated in FIGS. 4–10, and corresponding graphical user interface display screen illustrations will also be referenced. These display screens are shown in FIGS. 11–17.

Figure 4:
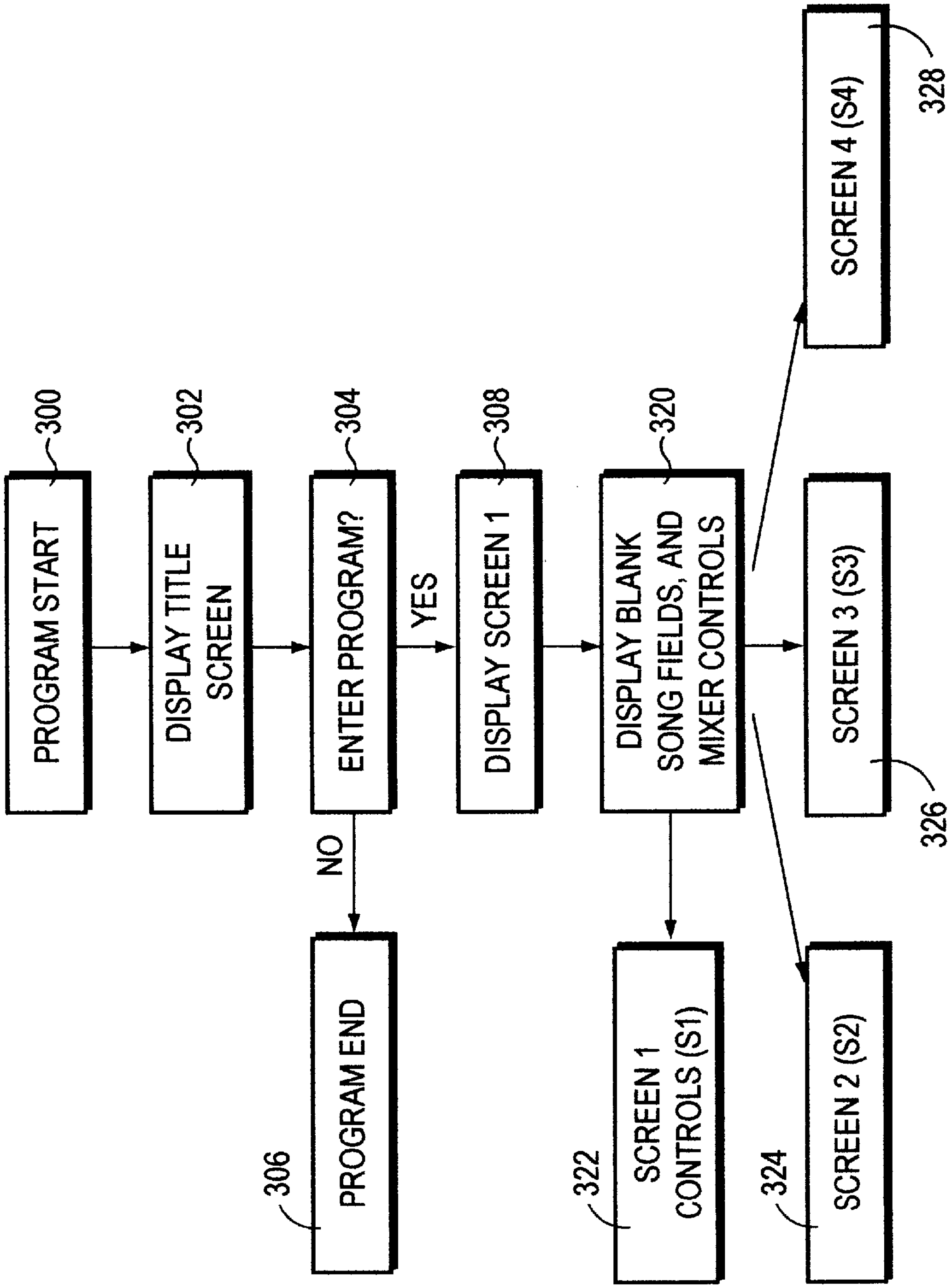
FIG. 4 is a schematic flow diagram illustrating a basic control data path for the music organizer and entertainment center of this invention.

Referring first to FIG. 4, the user initializes the program in a program start step 300. A title screen, not shown, is displayed 302. Any acceptable title screen can be used. The title screen prompts the user to enter the program in step 304. If the user does not desire to enter the program, it ends in step 306. If the user enters the program, then Screen1 is entered in step 308. Screen1 is shown in the display 310 in FIG. 11. Note that the various screens, entitled Screen1, Screen2, Screen3 and Screen4 are denoted respectively by buttons S1 (312), S2 (314), S3 (316) and S4 (318). These buttons appear on the bottom of all display screens used herein so that a user can quickly select between different control screens. The blank control fields are displayed in step 320. Based upon these fields, a user selects between Screen1 controls in step 322, Screen2 controls in step 324, Screen3 controls in step 326 and Screen4 controls in step 328.

Note that the Screen2 display 330 is shown in FIGS. 12, 13, 14 and 15. Likewise, Screen3 displays 332 are shown in FIG. 16 and Screen4 displays 336 are shown in FIG. 17. These screen displays will be described further below.

Figure 11:
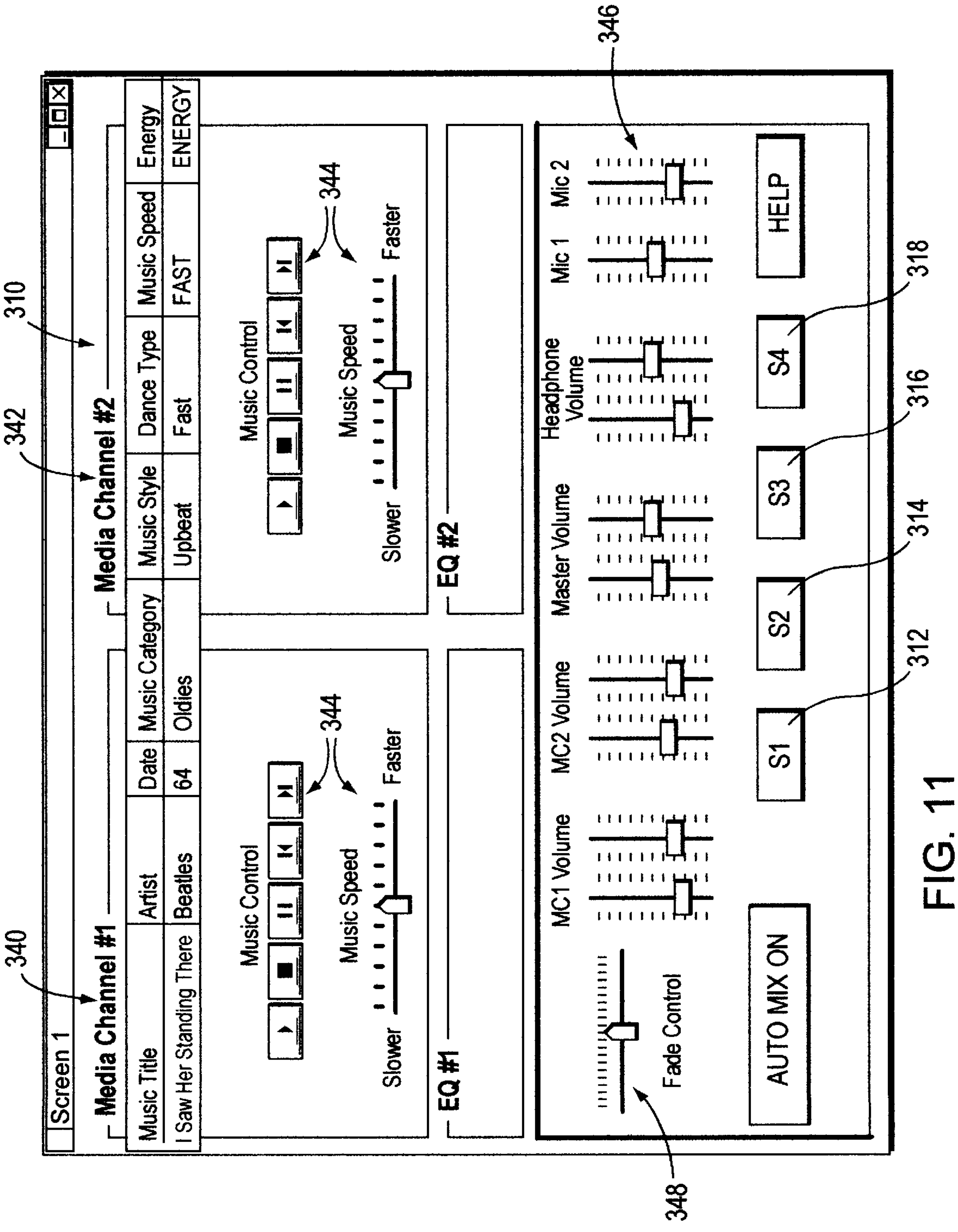
FIG. 11 is a plan view of a first graphical user interface screen.

With reference to Screen1, as shown in FIG. 11, various media channels for playing back music can be established. In this example, Channel1 340 and Channel2 342 are provided. Each channel includes an individual set of speed and playback buttons 344 having conventional control symbols allowing, for example, play, stop, pause, forward and reverse. Additional controls 346 can also be provided for the channels and can be used, for example, for specialized functions such as mixing of songs and overriding of songs using, for example, external microphone inputs. Note that, in particular, a fade control 348 is provided.

Figure 5:
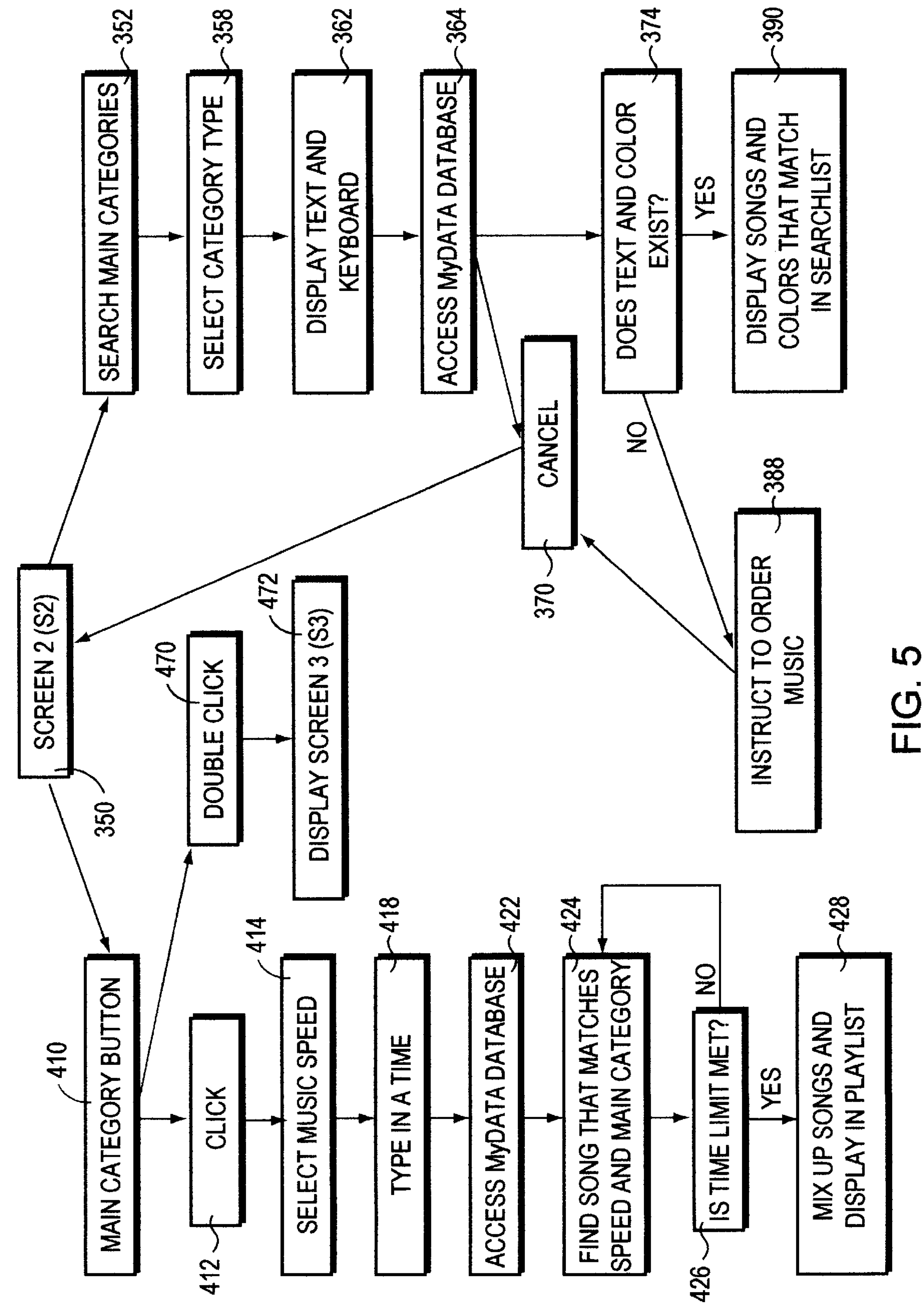
FIG. 5 is a schematic flow diagram illustrating the use of a graphical user interface screen selected according to the flow diagram of FIG. 4.
Figure 12:
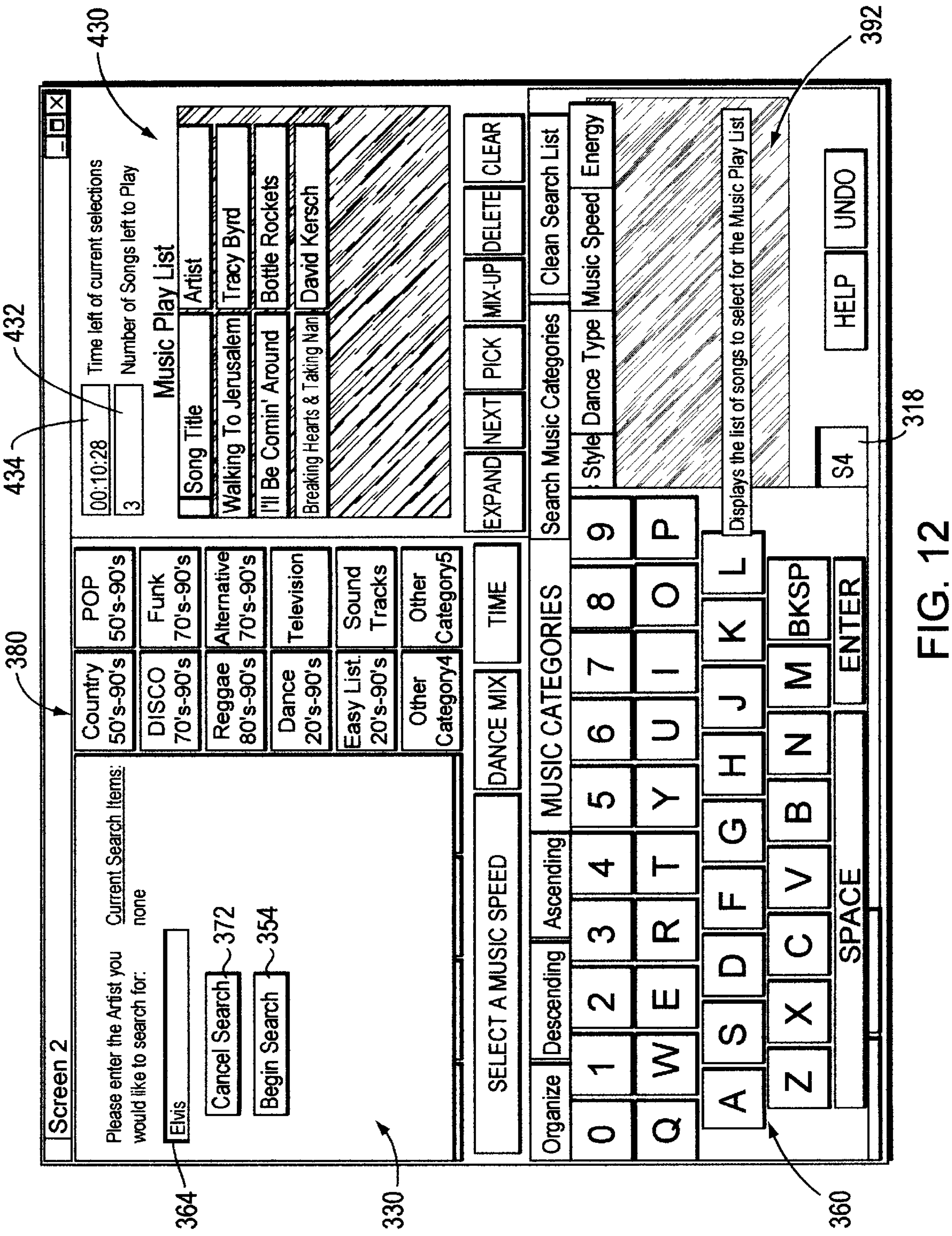
FIG. 12 is a plan view of a second graphical user interface screen.

FIG. 5 details user operations utilizing Screen2 after branching from step 350. Screen 2 is shown generally in FIG. 12, as noted above. By branching to the searching step 352, a user can search the main categories of music recognized by the system. The begin search button 354 (FIG. 12) controls the searching of main categories. As noted, a variety of categories such as artists, as shown in FIG. 12, can be searched. The selection of an appropriate category is noted in block 358. Various text can be entered using a keyboard 360 (FIG. 12) according to the block 362. The particular element being searched as shown in the window 364 causes the system program to access a main song database entitled MyData in block 364. The request can be canceled in block 370, which causes a branching back to the initial screen block 350. The button 372 enables cancellation.

Figure 13:
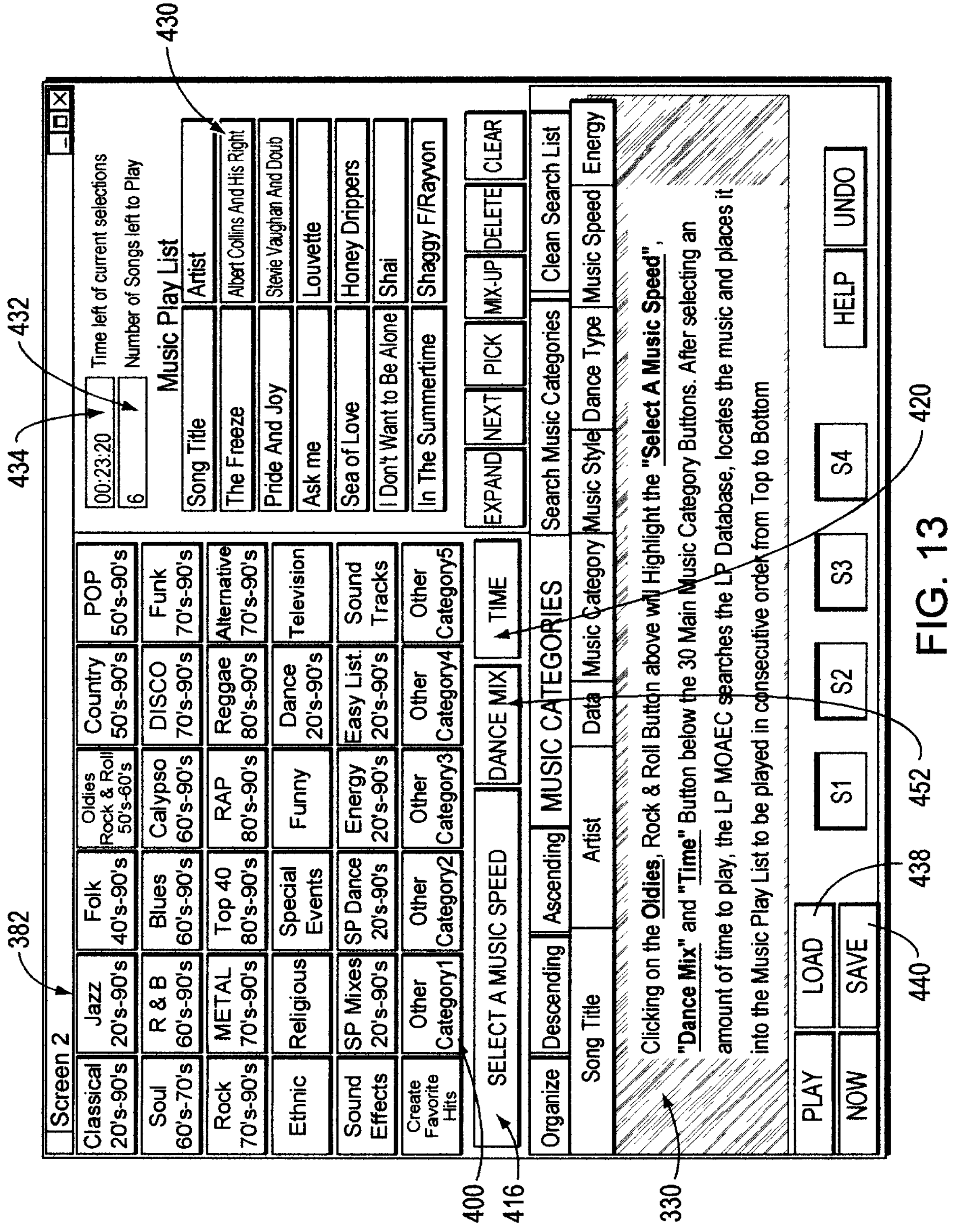
FIG. 13 is a more-detailed plan view of the second graphical user interface screen of FIG. 12.

If no cancellation occurs, then block 374 determines whether the requested category and text within the category exists. In addition, categories and information can be characterized according to a variety of colors, as displayed in the partial window of categories 380 and the more complete window, as shown in FIG. 13 as window 382. If the particular category and/or text does not exists, then block 388 notes its absence and suggests ordering the desired music. This block then branches to the cancellation block 370. Conversely, if the particular categories and/or text exists, then the appropriately organized songs are displayed according to block 390 in the window 392.

Screen2 acts generally, as a main control screen for searching and playing any selections within the center. The illustrated window 382 in FIG. 13 shows some of the possible categories that can be organized by the service provider and cross-referenced within the database with respect to each individual selection. "Other category" buttons 400 are provided for future expansion. If one of the main category buttons in the window 382 is selected, as shown in block 410, then the routine determines whether a single or double "click" of the user interface has occurred. If a single click occurs as shown in block 412, then the system prompts the user to select a music "speed" in block 414 according to screen button 416. The user is then prompted to input an appropriate time duration within which music will be played in block 418 based upon button 420. Given these parameters, the system accesses the database in step 422 to determine music matching, the selected criteria for time and category. Songs are entered in a play list according to the categories based upon blocks 424, 426 and 428. In particular, according to block 428, the songs can be randomized after the time and category criteria have been met to provide a "disc-jockey" type playback, which is somewhat arbitrary. The play list for the given time is detailed in window 430. The number of songs in the play list currently remaining as shown in window 432 and the time remaining is shown in window 434. Time values are based upon pre-entered time values provided by the service provider in the original database. Like other criteria, time of a song can be determined as an individual criteria. Conversely, the time of song can be measured based upon the size of the data file and upon other criteria well known to those of ordinary skill.

At any time, a portion of the current search list 451 is displayed, showing the various depicted categories such as title, artist, publication date, music category music style, dance type, music speed and energy in row-and-column form. The search list represents the selections located by pressing one or more category buttons. Songs from the search list can be appended to the end of the play list 430 by, for example clicking on their entry in the search list 451.

Figure 14:
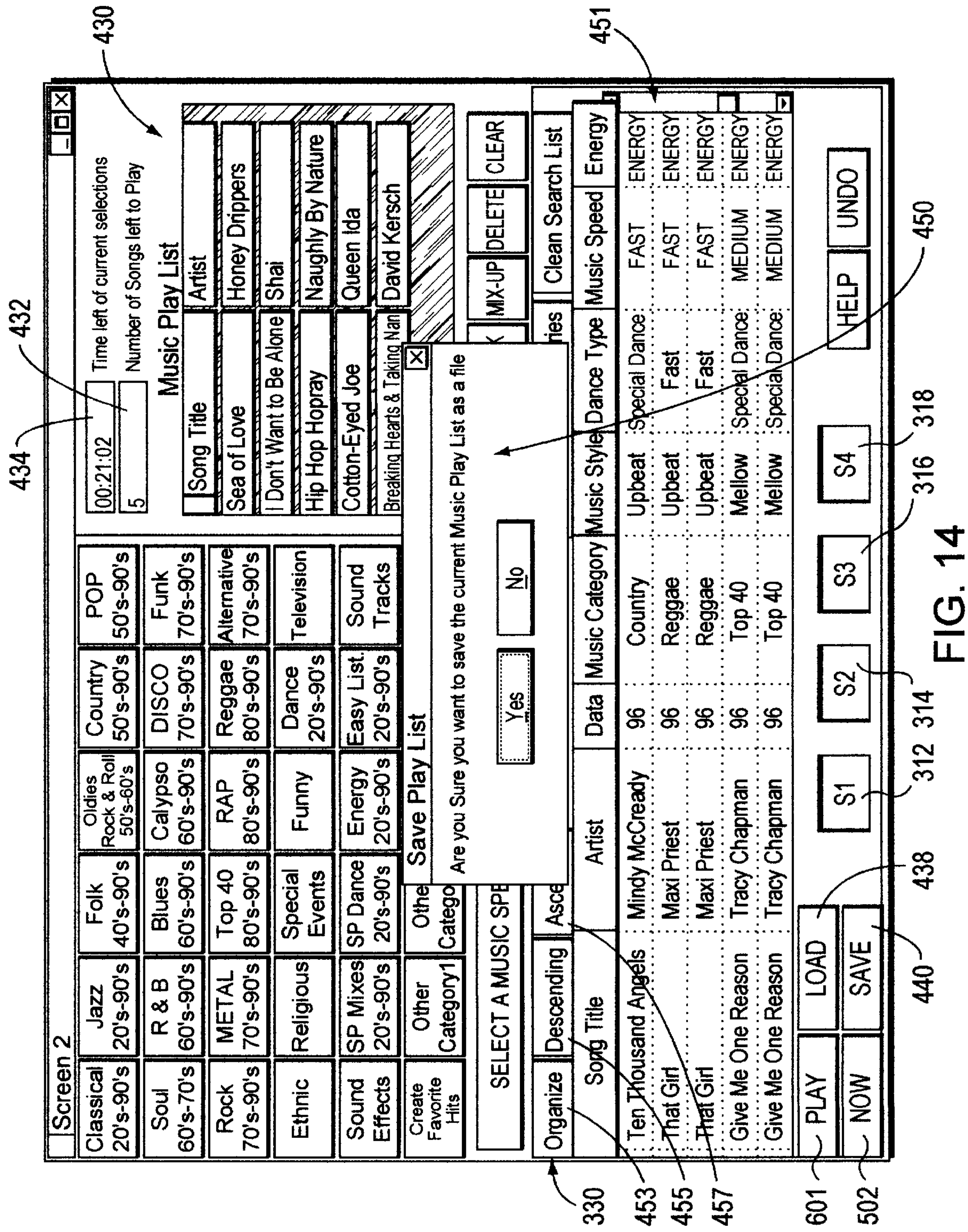
FIG. 14 is a more-detailed plan view showing the saving of music play list selections using the graphical user interface screen of FIG. 12.

Once a selected play list is created, the user has the option to load and/or save the play list using respective buttons 438 and 440. If the save button 440 is pressed, then a confirmation window 450 is displayed as shown in FIG. 14. This particular play list is assigned a name and can be replayed at any give time by calling up the particular play list from a menu.

A set of buttons of particular interest are used to organize the search list 451 so that the song titles therein are displayed in a desired manner. The organize button 453 allows displays to be refined. In particular, by pressing either ascending or descending buttons 455 and 457, respectively, the search results can be displayed in corresponding order.

Another button of interest as detailed in FIG. 13 is the "dance mix" button 452. This button is a default selection button that selects and searches for dance music having a particular speed. In a preferred embodiment, this function specifically selects, at random from the MyData database, three dance category songs with a fast speed category followed by two dance category songs having a slow speed category. These songs, the order three fast and then two slow are placed in the music play list for playback at the earliest available time.

Figure 15:
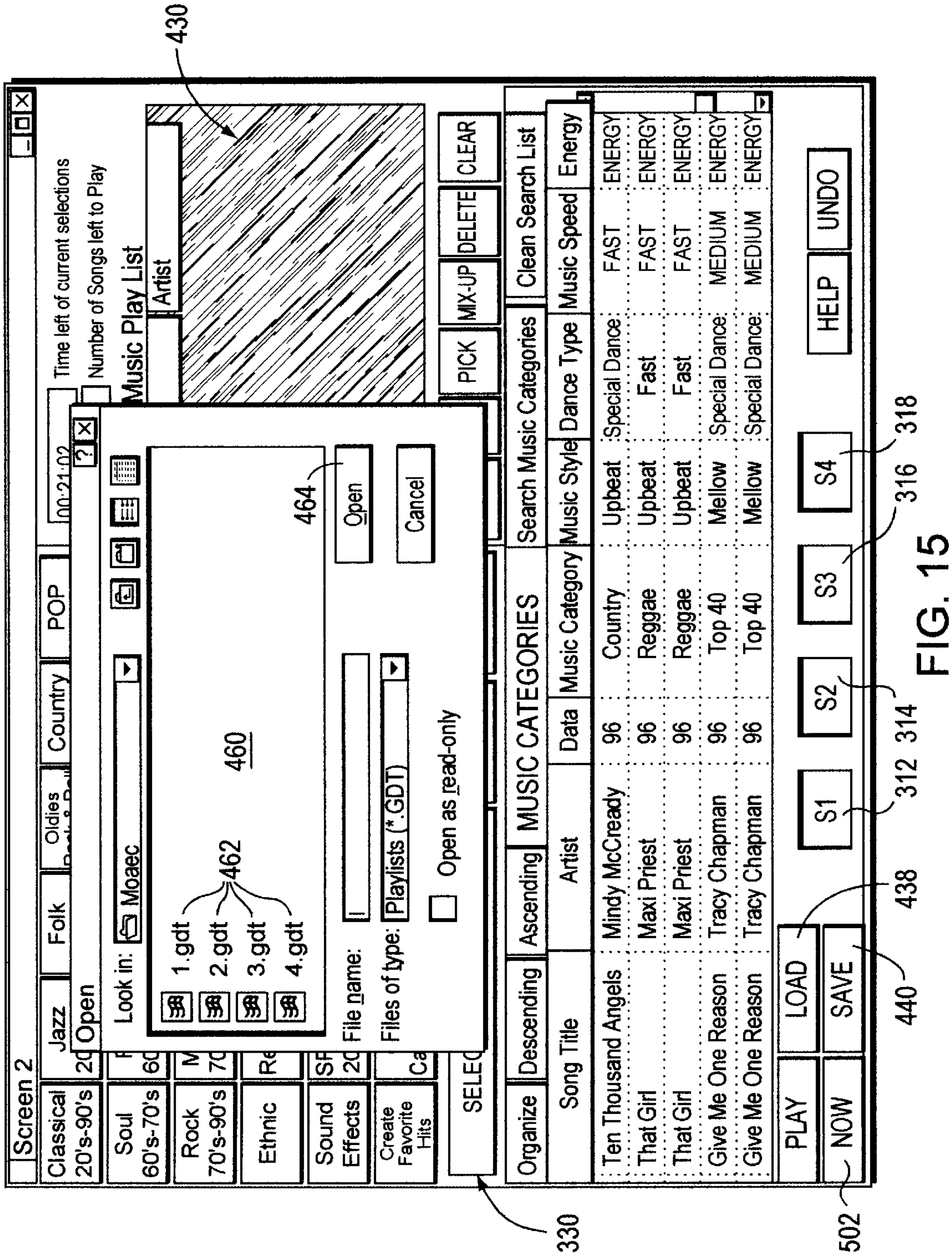
FIG. 15 is a more-detailed plan showing the loading of a music play list using the graphical user interface screen of FIG. 12.
Figure 16:
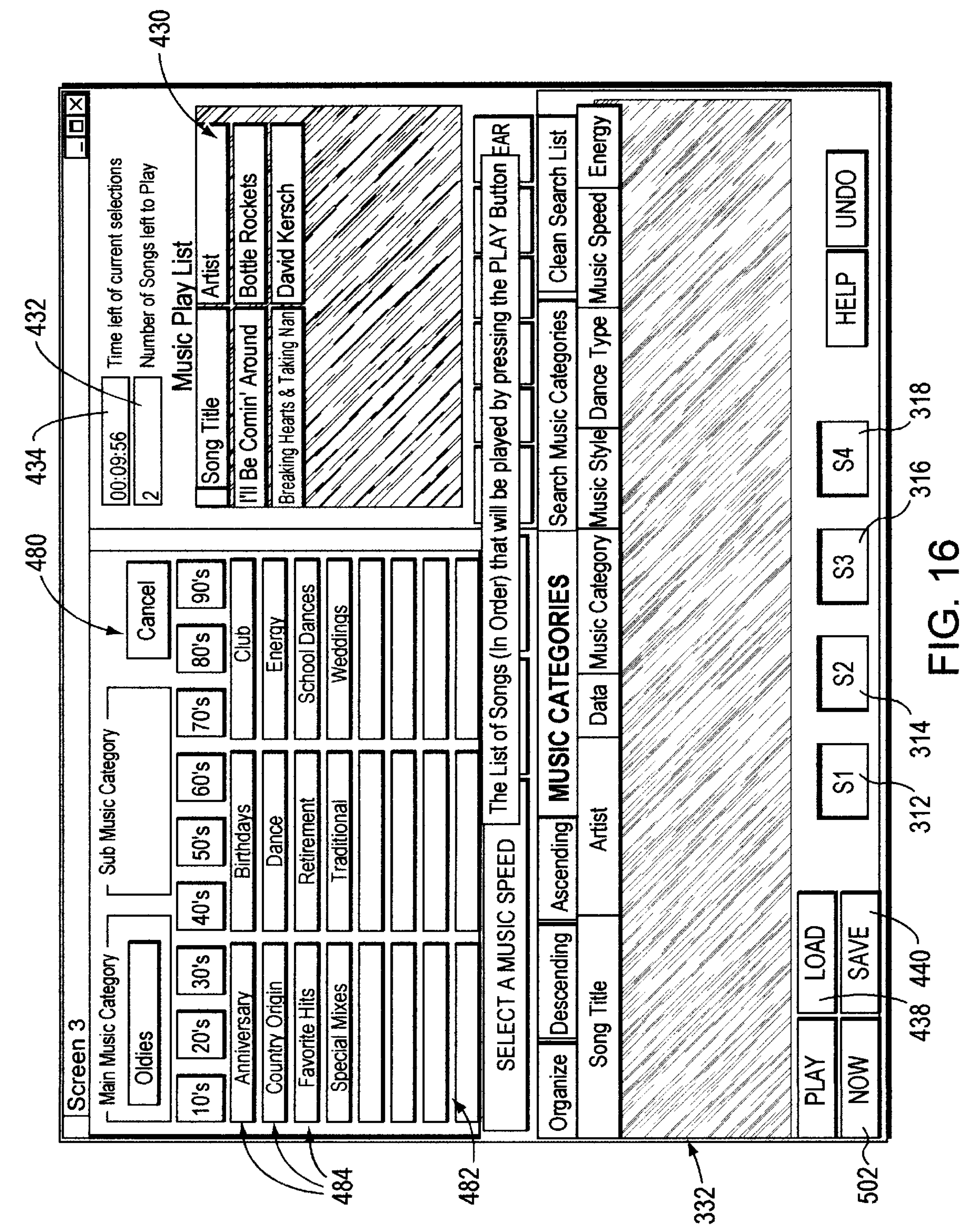
FIG. 16 is a plan view of a third graphical user interface screen.

FIG. 15 shows a file listing window 460 having a four separate play list files 462 that can be selected. The selected play list file 462 can be transferred to the main music play list window 430 by pressing the open button 464 within the window 460.

Before discussing the system procedure further, it is noted that pressing the category button as detailed in step 410 (FIG. 5) twice (e.g., "double click") as shown in block 470, causes the particular category button to display Screen3 480 (FIG. 16). The display of Screen3 is detailed in block 472. Screen3 provides a window 482 with sub-categories that fall under a particular music category. The sub-categories are listed as individual buttons 484. These categories can comprise a variety of parameters such as time frame, special occasions, type of music, etc. In addition, the basic categories such as speed or "energy" can be included as sub-categories under a particular category.

Figure 6:
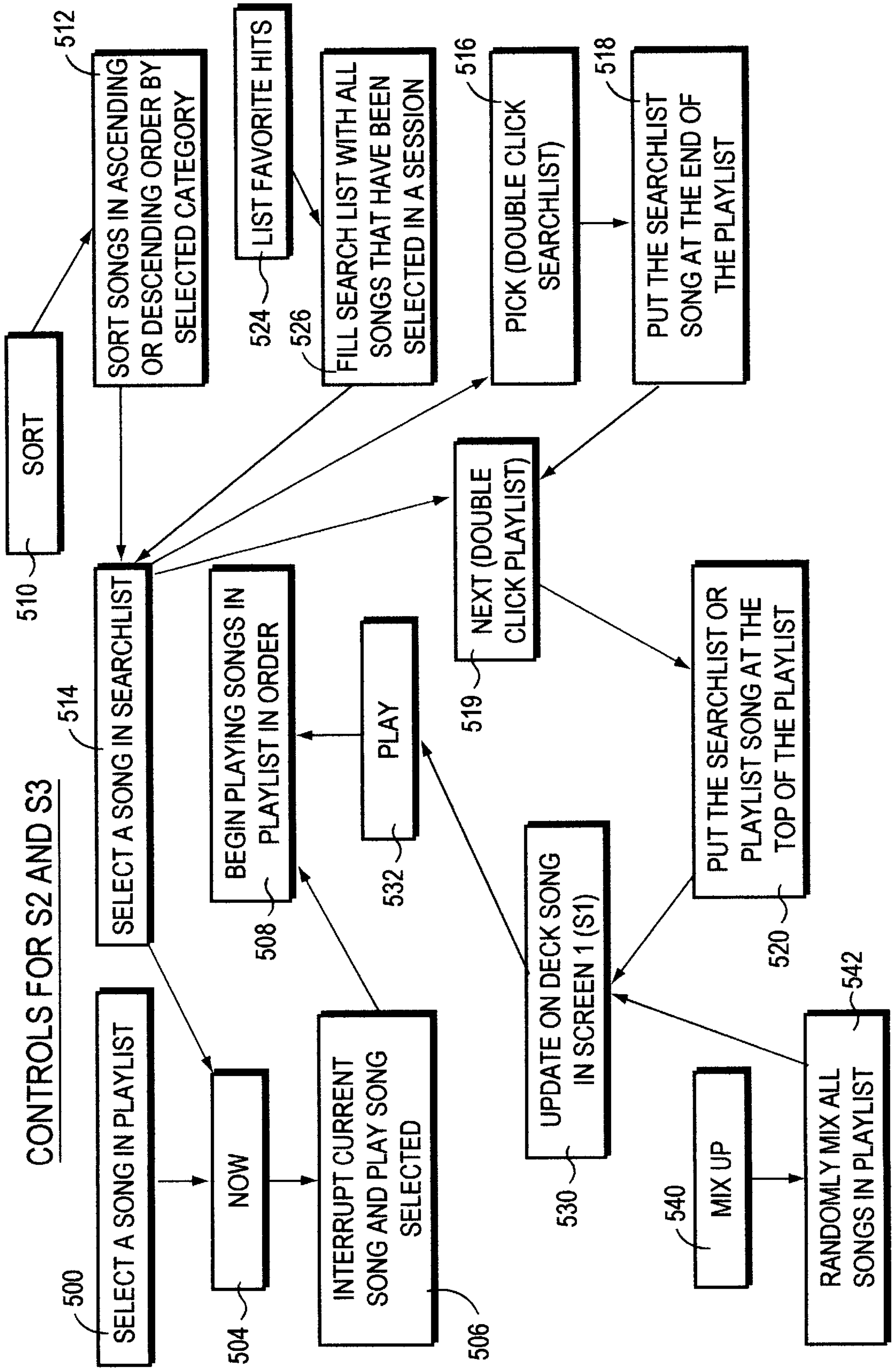
FIG. 6 is a schematic flow diagram showing the selection of a graphical user interface screen selected according to the flow diagram of FIG. 4.
Figure 7:
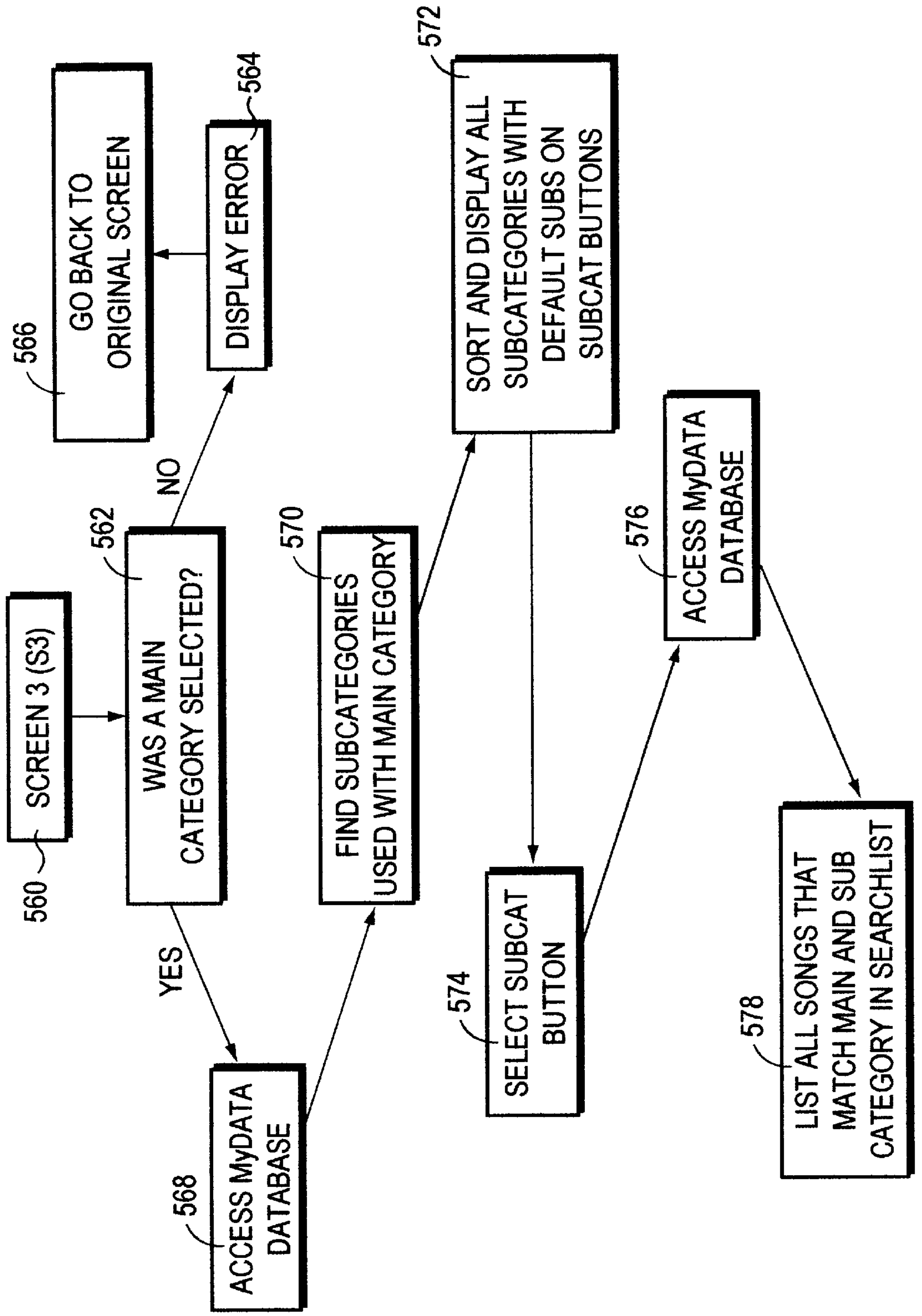
FIG. 7 is a schematic flow diagram showing the selection of a graphical user interface screen selected according to the flow diagram of FIG. 4.

Further reference is made to FIG. 6. The controls for Screens2 and 3 will be described first, in further detail. When a particular song in a play list is selected by, for example, highlighting a song with the cursor as detailed in block 500, the song can be played immediately by pushing the Now button 502 as detailed generally in block 504. Any current song being played is interrupted in block 506 and the selected song is played instead. Subsequently, the play list begins playing songs in the prior order in block 508. Conversely, if the sort command is given in block 510, then songs are sorted in ascending or descending order according to a selected category in block 512. A song in the search list is selected in block 514. The song selected can be played according to the Now block 504. Alternatively, the pick block 516 can be used to put the searched song at the end of a given play list as shown in block 518. If the play list song is "clicked" twice as shown in block 519 then the search list song selected is placed to the top of the play list in block 520. In addition, a listing of favorite hits/selections can be requested by the user in block 524. This causes the search list to be filled that have been pre-selected in block 526 and a song from the search list is selected in block 514. Block 514 then branches to the now block 504 and continues as described.

Referring again to block 520, if a song is placed at the top of the play list the song is updated in Screen1 in block 530. The song is then played based upon the play block 532. If the mix up command is entered by the user in block 540, then songs in the play list are randomly mixed in block 542 and Screen1 is updated in block 530. As described above, the play command 532 causes songs to be played in the play list order selected in block 508.

The selection of Screen3, shown in block 560, then the system determines whether a main category was selected in block 562. If not, then an error message is displayed in block 564 and the original screen is re-displayed in block 566. If a main category is selected in block 562, then the system accesses the MyData database of songs and categories in block 568. Any appropriate sub-categories are listed based upon that particular main category in block 570. Sub-categories are sorted and displayed on appropriate default sub-category buttons 572 shown in the window 482 in FIG. 16. The user can select appropriate sub-category buttons by "clicking" on them as shown in block 574. The MyData database is accessed in block 576 based upon the selected sub-categories and all songs that match the main and sub-category selections are listed in block 578. This listing is shown in the search window 332. Note that the search window 332 displays various category information such as title, artist, date, music category, music style, dance type, music speed and energy. Of course, this can also be included as desired by the service provider who originally formats such categories. In addition, custom category information can be included based upon the user's desires.

Figure 8:
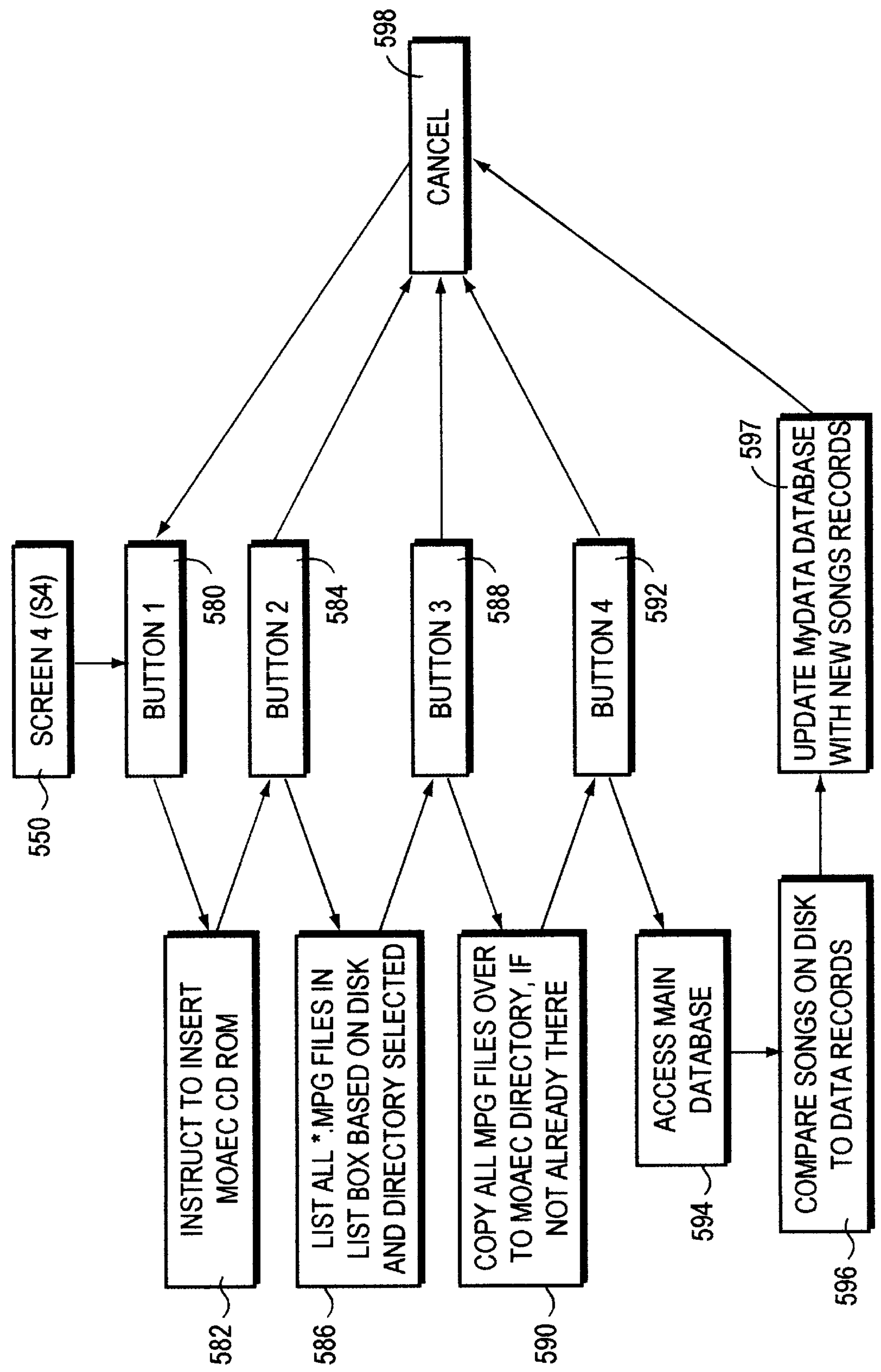
FIG. 8 is a schematic flow diagram of a graphical user interface screen selected according to the flow diagram of FIG. 4.

FIG. 8 relates to the selection of Screen4 as shown in block 550. Screen 4 is also illustrated generally as the display 336 in FIG. 17. The display is organized to display all songs within the user's library and the broader service provider's library. The display 336 includes columns showing data test status 552, song identification number 554, disc number (e.g., the disc on the service provider on which the song resides 556) the catalog song number 558, the title 590, the artist 592, the music style 594, the dance type, if any, 596, the speed 598, the time in seconds 570, the energy level, if any, 572 and any other appropriate category.

The entire library of the service provider can be provided in this format to the users, so that the user can select the songs that it wishes to order at later times. Aseries of buttons can be provided within Screen4. The first button, Button1, shown in block 580 instructs the user to insert an appropriate CD-ROM containing music and category data in block 582. The user is then prompted to use Button2, shown in block 584. This button lists all compressed data files based on the particular disc and directory selected in block 586. The user is then prompted by Button3 in block 588. Activating this button causes the copying of all compressed files from the disc over to the directory if these files are not already present in block 560. The user is then prompted by Button4 in block 562. Activating this button accesses the main database in block 564. Songs on the CD-ROM are compared to the data records within the center in block 566. The MyData database is updated with new songs in block 567. At any time, the canceled button can be pressed as shown in block 598, which returns to the Button1 prompt of block 580.

Figure 9:
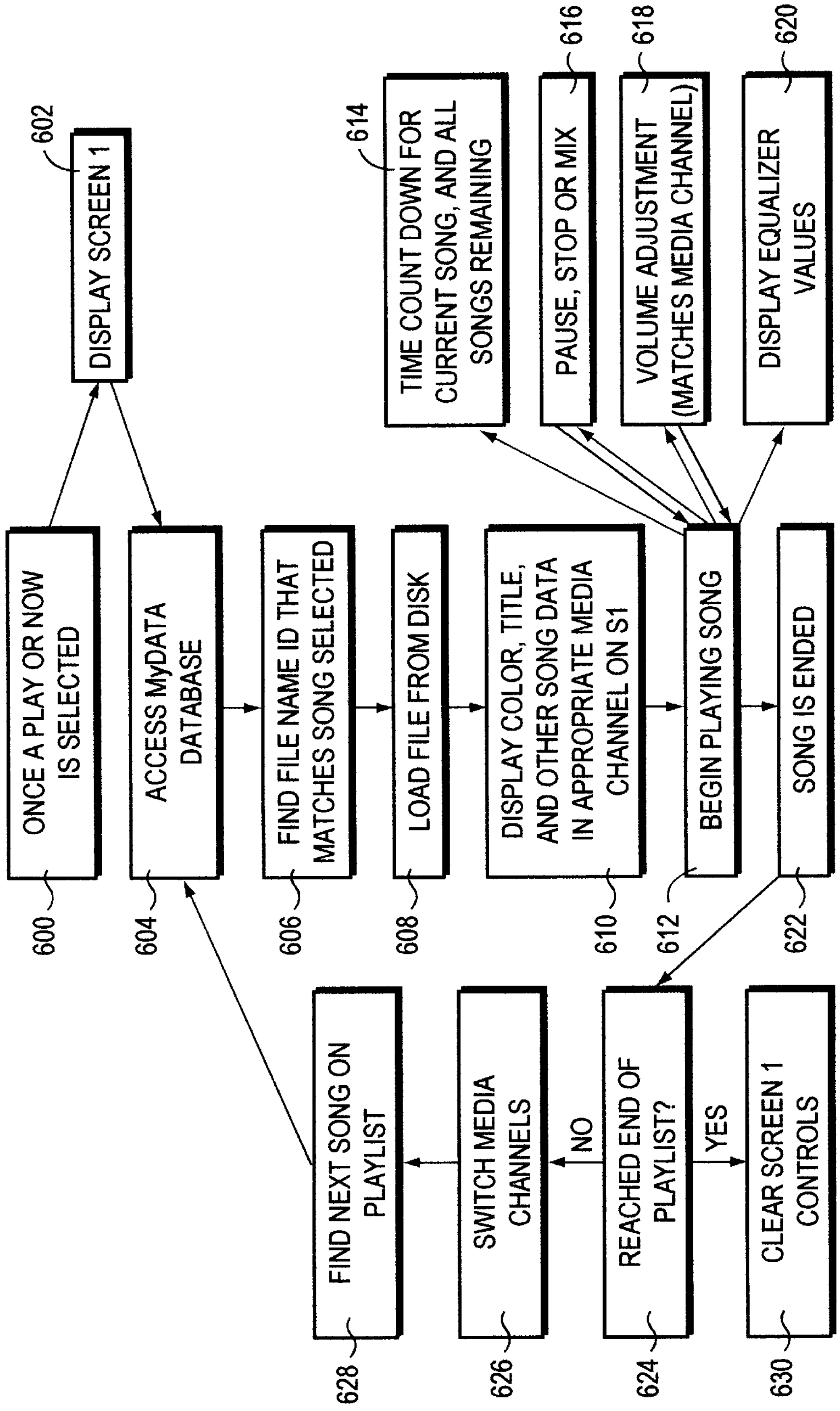
FIG. 9 is a schematic flow diagram of the playback process using the graphical user interface screens selected according to the flow diagram in FIG. 4.

Reference is now made to FIG. 9. If a Play (see button 601, FIG. 14) or Now button on the screen is selected in block 600, Screen1 is displayed showing the various playback controls in block 602. The MyData database is accessed in block 604. The file MID that matches the selected song is searched for by the system in block 606. The file is loaded from the disc in block 608. Again, this file is retrieved from the disc in MPEG3 data compressed format. A particular color for the song, which may correspond to a given set of categories, as well as a title and other data are provided to one of the media channels in Screen1 in block 610. The song begins playing in block 612 as soon as the data is ready. A time countdown for the song is initiated using known techniques in block 614. If a pause, stop or mixed command is received in block 616 then these steps, is described above, are carried out. In particular, a pause or stop ends playing of the song either temporarily (e.g., until pause is pressed again) or permanently, in case of a stop command.

Volume adjustment and other equalizer values can be provided according to block 618 and 620. These act upon the playback of a song using known techniques. When the particular song has ended in blocks 622 the system checks whether it has reached the end of the current play list in block 624 if not, media channels are switched in block 626 and the next song on the play list is located in block 628. This song information is transferred back to block 604 and the name of that new song is located in block 606. The process continues as described above.

If the end of the play list is reached in block 624, then Screen1 controls are cleared in block 630. The system awaits further instructions at this time.

Figure 10:
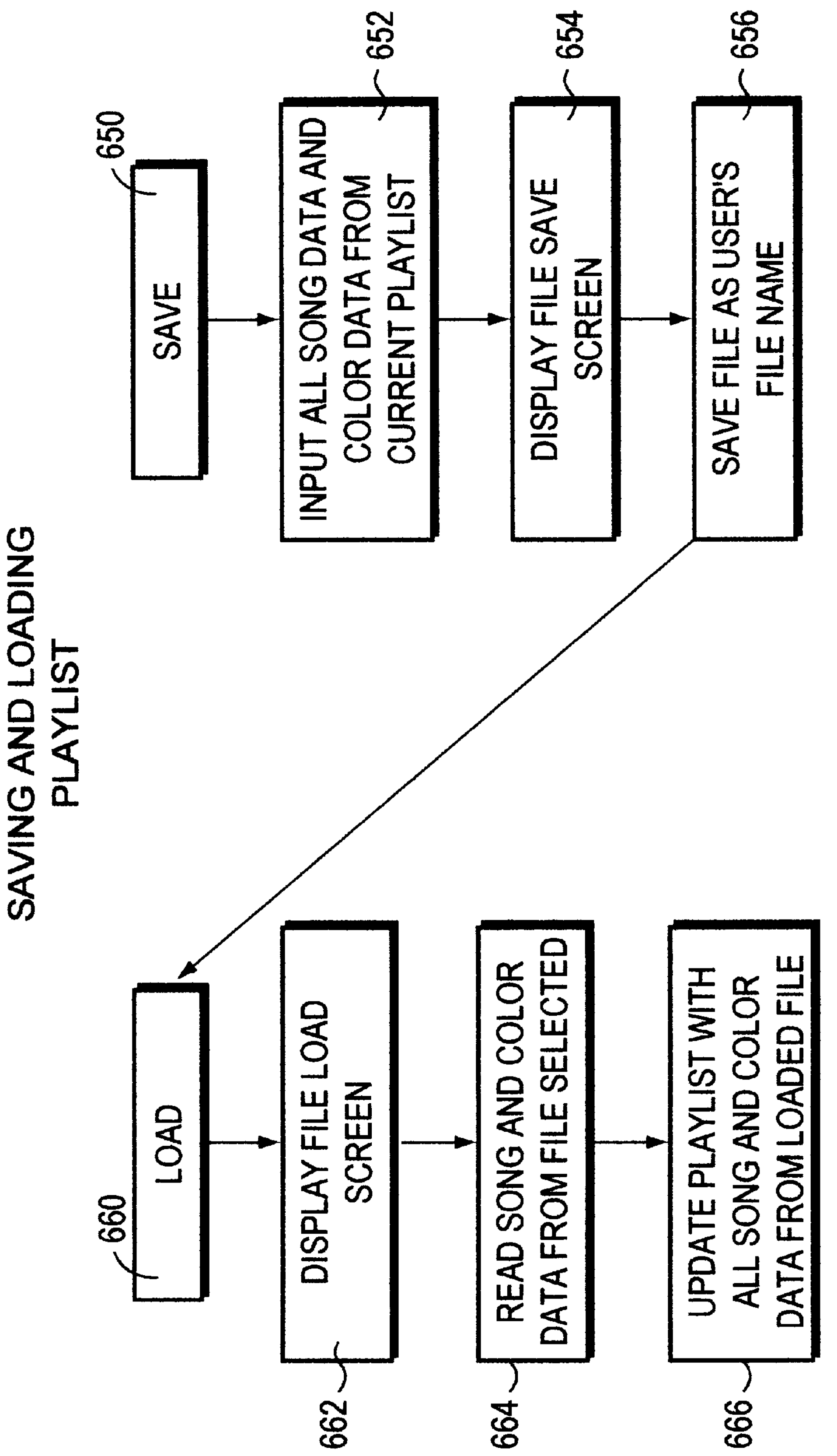
FIG. 10 is a schematic flow diagram showing the saving and loading of play lists using the music organizer and entertainment center according to this invention.

FIG. 10 describes the saving and loading of play list in more detail. If a save command is initiated by the user in block 650, then all song data and associated colored data for the display from the current play list is collected 652. The file save window is placed on the screen in block 654. The user can select an appropriate file name for saving the particular play list file in block 656. Again, the display for this procedure is detailed in FIG. 14.

If a load command is entered by a user as shown in block 660, then the file load window is displayed in block 662. The display for this window in shown in FIG. 15.

Song and color data are read from the selected file in block 664 and the current play list is updated and/or replaced with all song in color data from the loaded file in block 666.

It is specifically noted that category information is provided by the service provider appended to each song in the database. The accessing of songs having such data appended thereto occurs according to applicant's unique graphical user interface based upon provider categories. The association of various database identifiers to each song is implemented using conventional database programs such as the above-described Microsoft Access® 2.0. The association of category objects to song data should be conventional to those of ordinary skill. The storage of MPEG3 data compressed song files is accomplished in the same manner as other data stored as files in a database. The Microfiche Appendix included in the subject application pursuant to 37 CFR 1.96(c) contains a listing of program commands in the commercially available Visual Basic language for implementing various functions of the center according to this embodiment.

Figure 19:
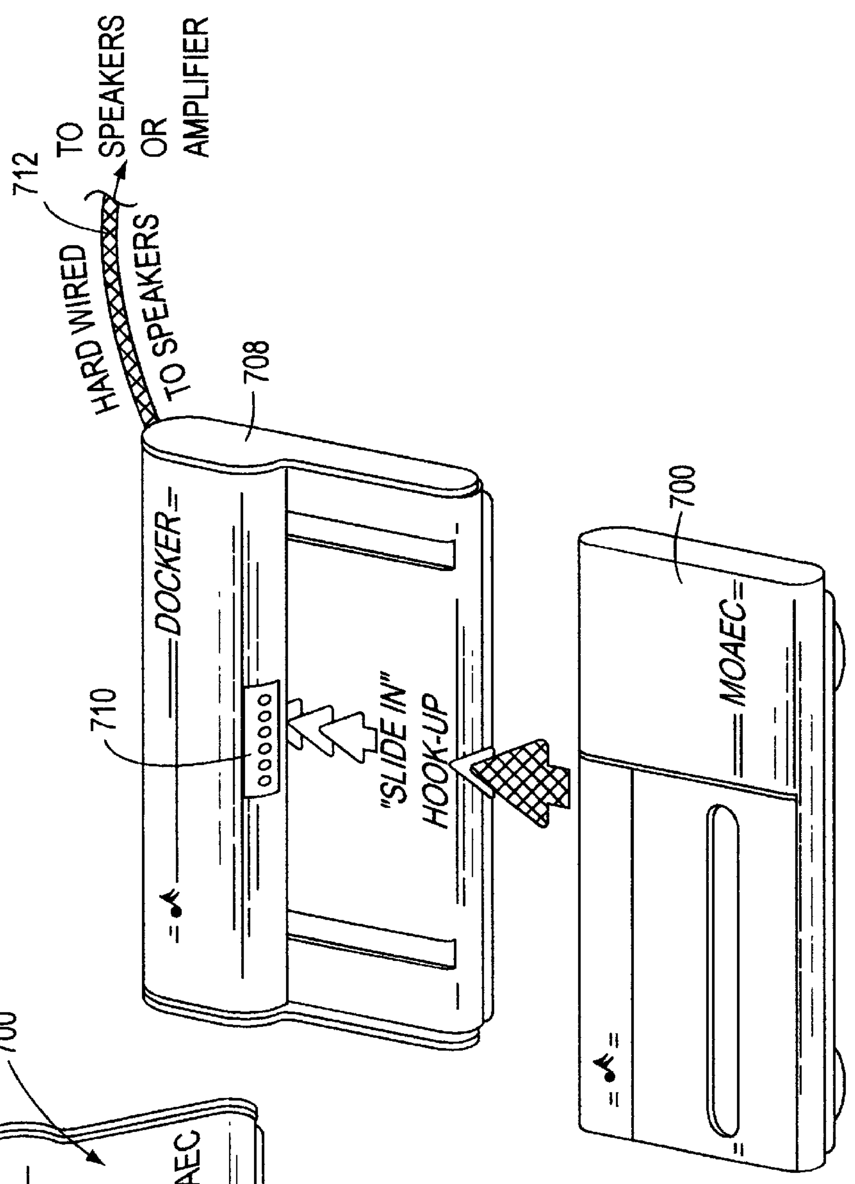
FIGS. 18 and 19 are perspective views of an exemplary music organizer and entertainment center according to an alternate embodiment of this invention utilizing a base unit and docking principle.
Figure 18:
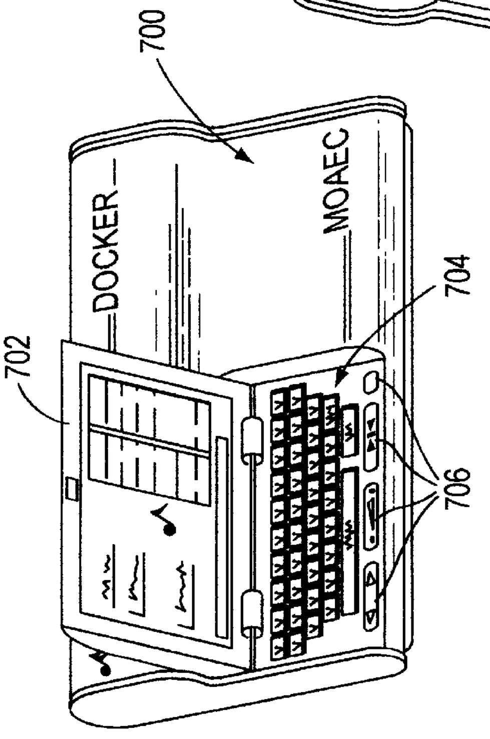

Using the hardware and software elements described above, FIGS. 18 and 19 detail a docking mechanism in which music is stored on a hard drive or other electronic medium in a main data handling unit 700 with a flip-up display 702 and associated keyboard 704 that can include playback controls 706 (e.g., play, stop, pause, forward and reverse). The unit 700 can be "docked" to a base unit 708 that includes a connector 710 for interfacing with an associated connector in the unit 700. A cable 712 can interconnect the base unit 708 with appropriate speakers or amplifiers. The unit 700, hence, can include the music data for the system and can be moved from location to location so that there is no need to purchase additional playback units to play music provided from the service provider with the particular code.

Figure 20:
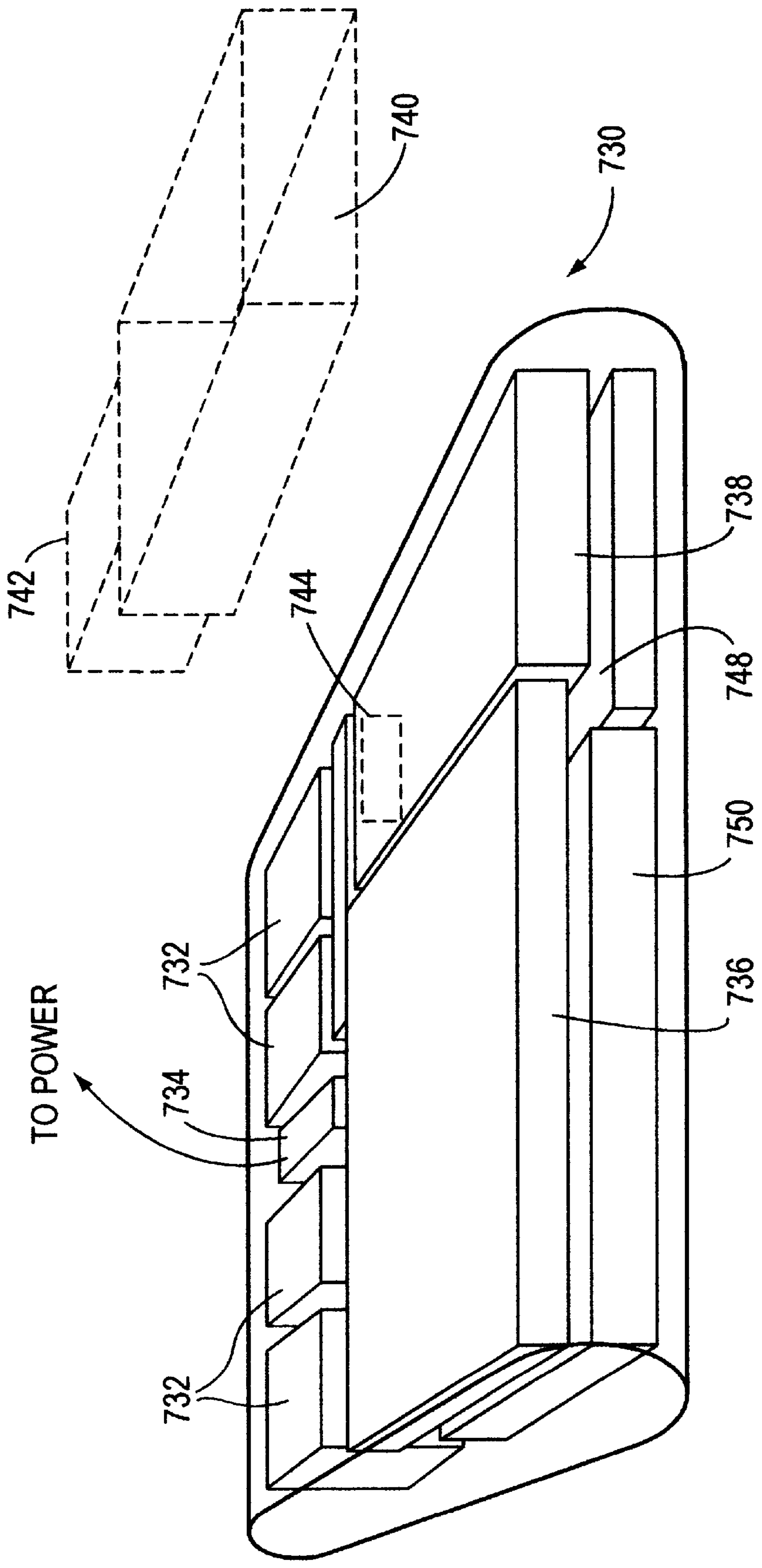
FIG. 20 is yet another alternate embodiment of a music organizer and entertainment center utilizing a docking principle for a main hard drive.

FIG. 20 illustrates and alternate embodiment for docking unit in which a base unit 730 includes speakers 732, a power coupling 734, a flip-up display 736 and a removable memory storage device, such as a compact hard drive 738. The hard drive is shown removed in phantom 740. A connector 742 can interface with an associated connector (shown in phantom) 744 on the base unit. The hard drive, itself, it moved from base unit to base unit so that, again, there is need to purchase music only once, and that music is identified to a particular hard drive. The base unit can also include a CD-ROM shelf 748 for reading music during the original loading process. In certain remote units, the CD-ROM may be omitted, since all music is contained on the hard drive and loading of music is accomplished with the base unit 730. A motherboard 750 controls the operations of the unit.

Figure 21:
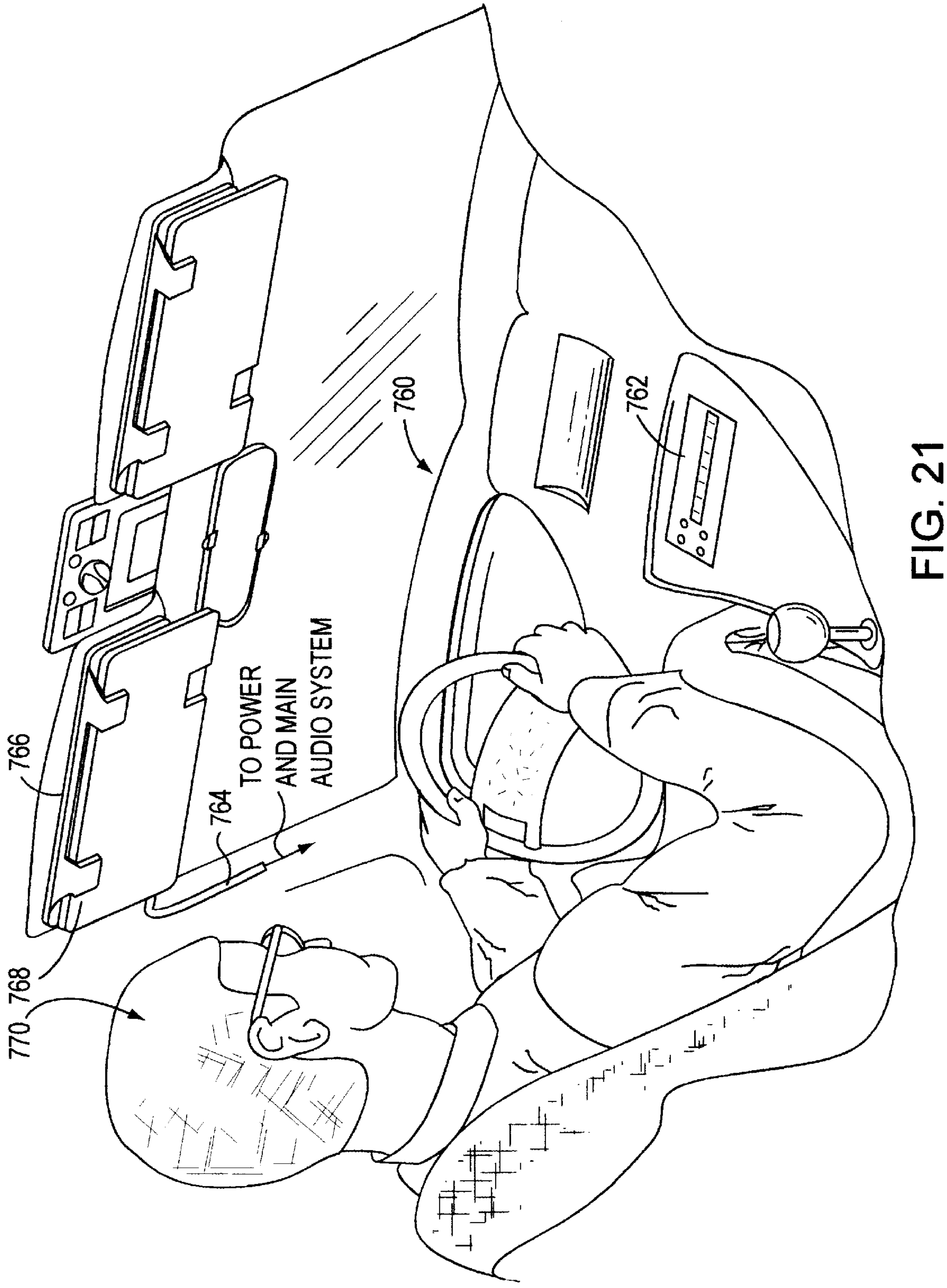
FIGS. 21 and 22 are perspective views of yet another exemplary music organizer and entertainment center for use in mobile environments including, for example, the docking element shown in FIG. 20.
Figure 22:
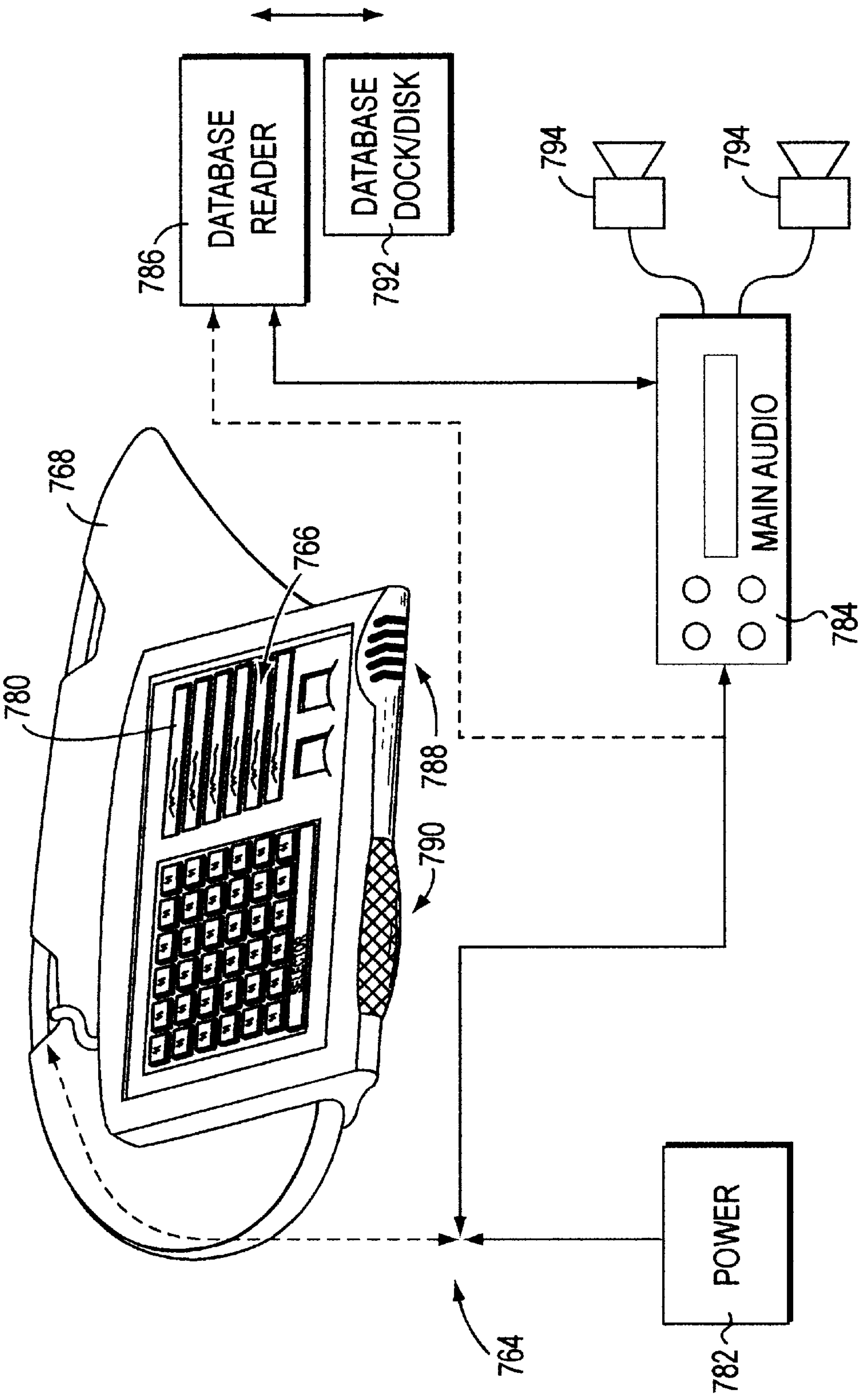

FIGS. 21 and 22 illustrate a mobile playback system according to this invention. The above described docking units in FIGS. 19 and 20 can be utilized in conjunction with this unit. In other words, an entire hard drive or unit can be interfaced with an onboard automotive base unit to enable music in the hard drive or docking unit to be played within a car or other vehicle. In this embodiment, the automotive interior 760 is provided with a main audio system 762. Various cords 764 interconnect the main system to a contact display unit 766 that, in this embodiment, is located on the sun visor 768 where the driver 770 can easily access it. It is contemplated that the display unit can be located at any acceptable location. Alternatively, the unit can be entirely operated by voice commands, with no display unit, and instead, a voice response system implementing conventional voice-generating software. With further reference to FIG. 22, the sun visor 768 is lowered to reveal the display 766 having a screen 780. The wires 764 interconnect the display with a power source 782, that can be part of the main audio system 784 or can be separate. The wires also connect the display 780 with the main audio system 784, or alternatively, can be routed directly to the vehicle's onboard database reader 786. The database reader is any microprocessor-based system as described above. It can be exclusively a disc drive or other high-volume data reader or can include many of the processing functions performed by the center. Alternatively the processor functions can be performed within the display 766. The display 766 includes a microphone 788 for voice activation. As described above, conventional voice-recognition software can be used in conjunction with the center. A hand grip 790 is provided for moving the display to an acceptable position. The database reader interfaces with an onboard docking unit or disc 792, as described above. This can be removed when not in use for placement in another database reader, such as the base unit 730 shown in FIG. 20. Music is routed from the database reader 786 or the display 766 depending upon where the microprocessor are located, back to the main audio unit 784 where amplification occurs. The music is played back on appropriate speakers 794.

Figure 23:
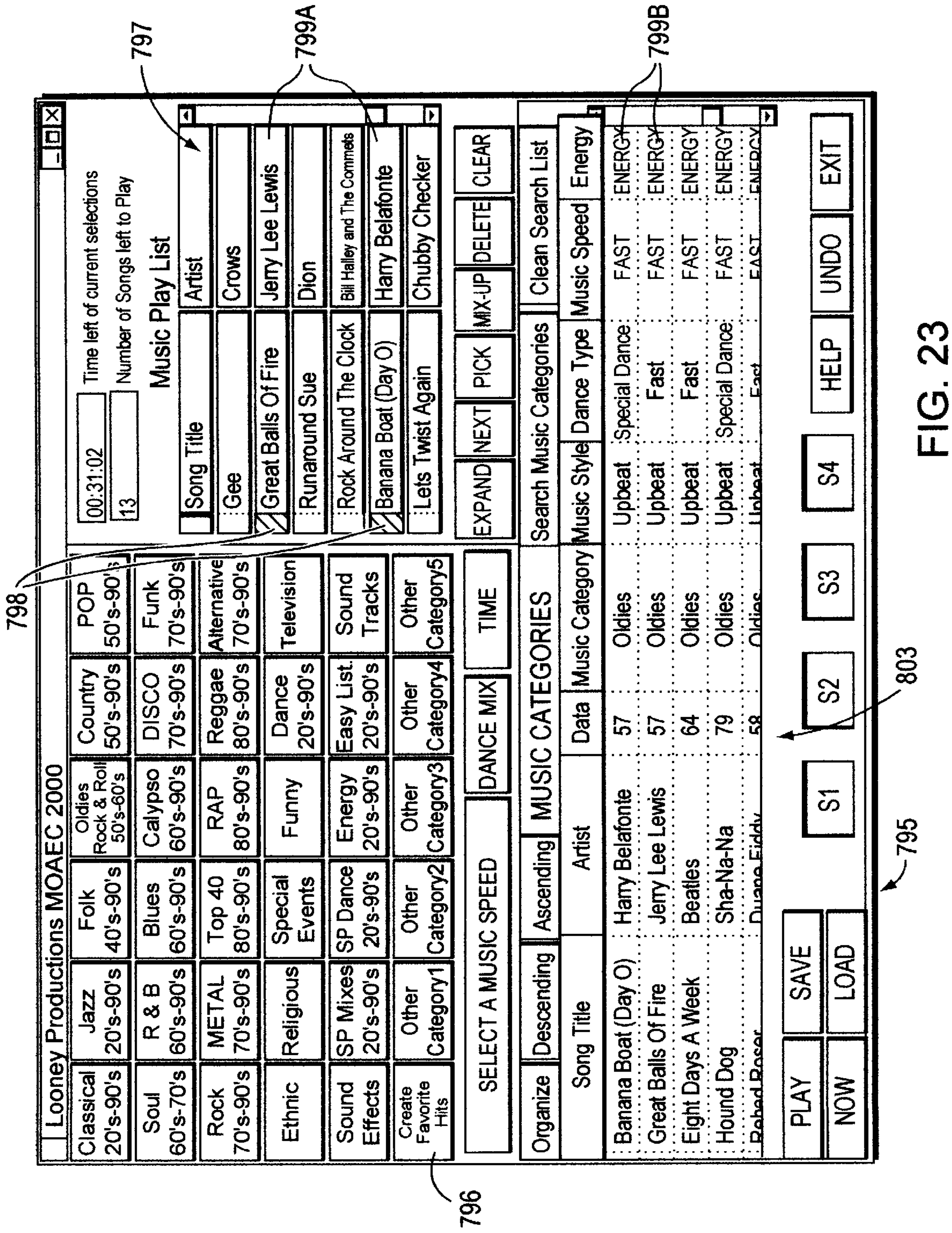
FIG. 23 is a plan view of the graphical user interface screen of FIG. 12 detailing a favorite hits function.

Reference is now made to additional features that can be implemented according to certain embodiments of the invention. FIG. 23 details a favorite hits function that can be applied to Screen2. The display 795 includes a favorite hits category creation button 796. Favorite hits, when identified by a user on the current play list 797 can be flagged by "clicking" on the individual titles. A colored flag 798 appears next to flagged songs. Unflagging can involve a second click on a flagged song or a separate delete button on the screen. The flagged songs 799A appear as top selections 799B on the current search music categories list 803. By clicking on the create favorite hits button 796, these favorites can be saved, so that they always appear at the top of the search categories list 803. In this manner, they can be retrieved to place on the play list within seconds. Again, any song on the search categories list 803 can be transferred to the play list for playback in a desired order (typically first-in-first-out) by simply clicking or-double clicking on the specific search list song entry.

Figure 24:
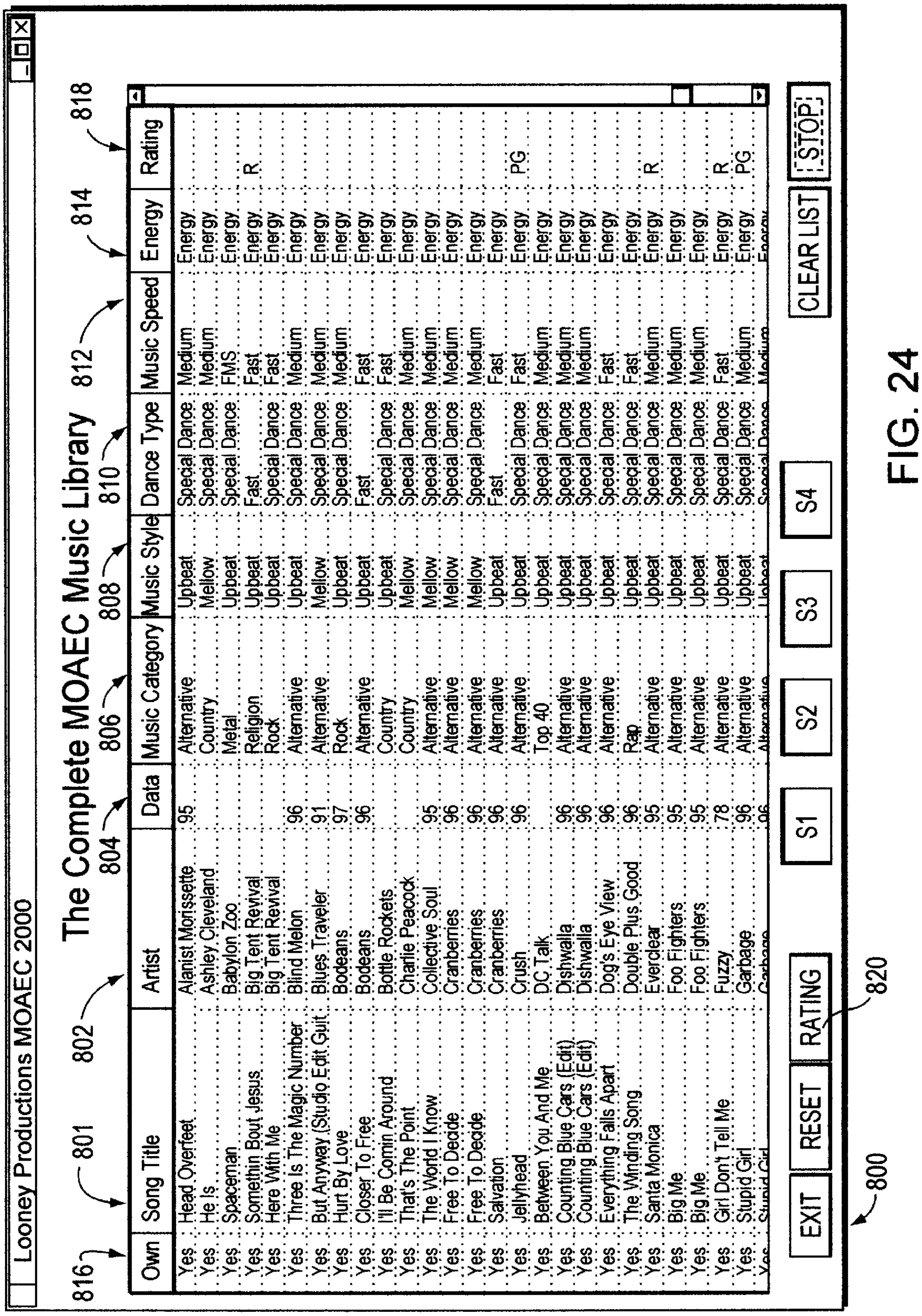
FIG. 24 is a plan view of the fourth graphical user interface screen showing a display of the service provider's available library.
Figure 25:
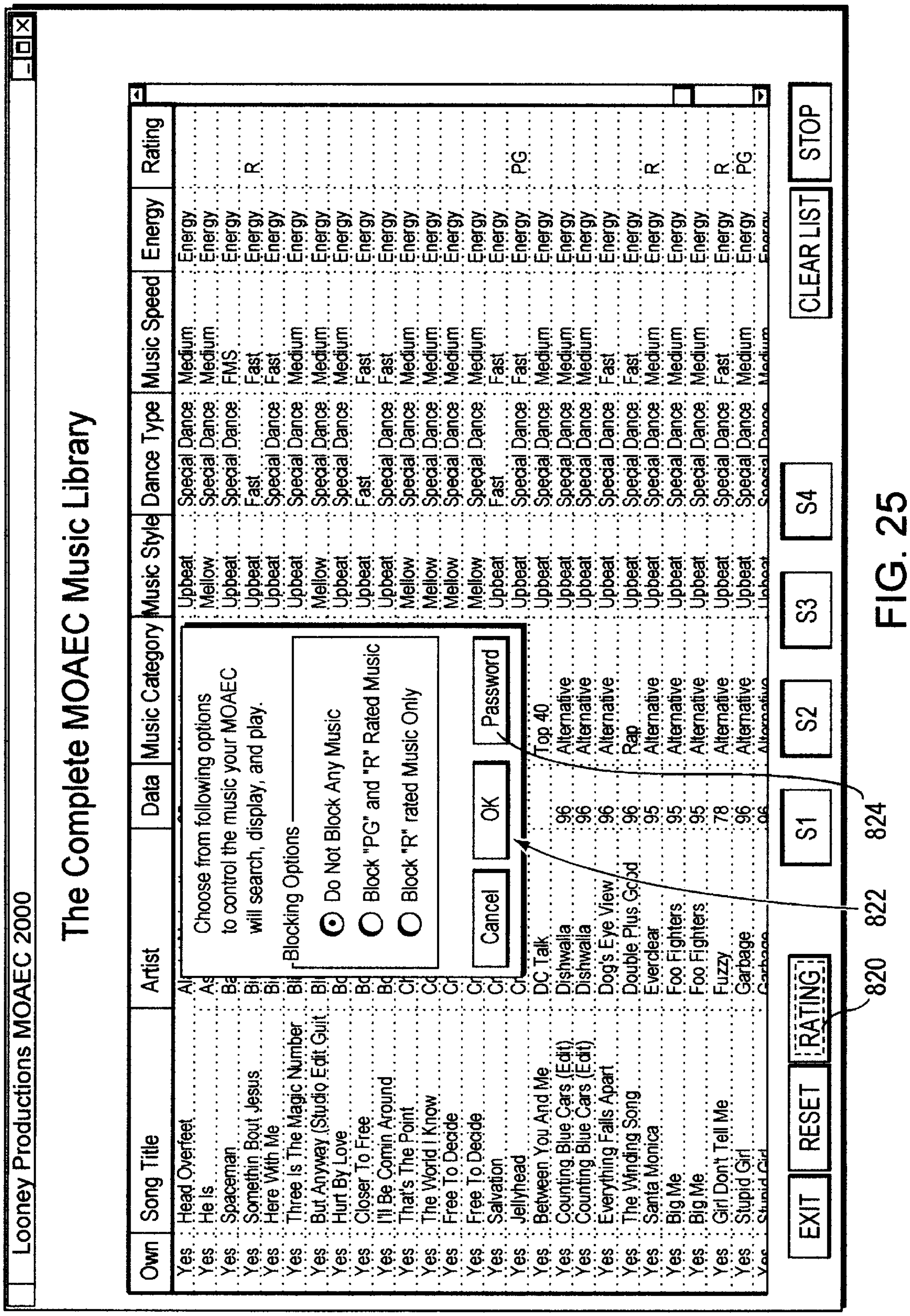
FIG. 25 is a plan view of the graphical user interface screen of FIG. 24 showing the use of a rating category.
Figure 26:
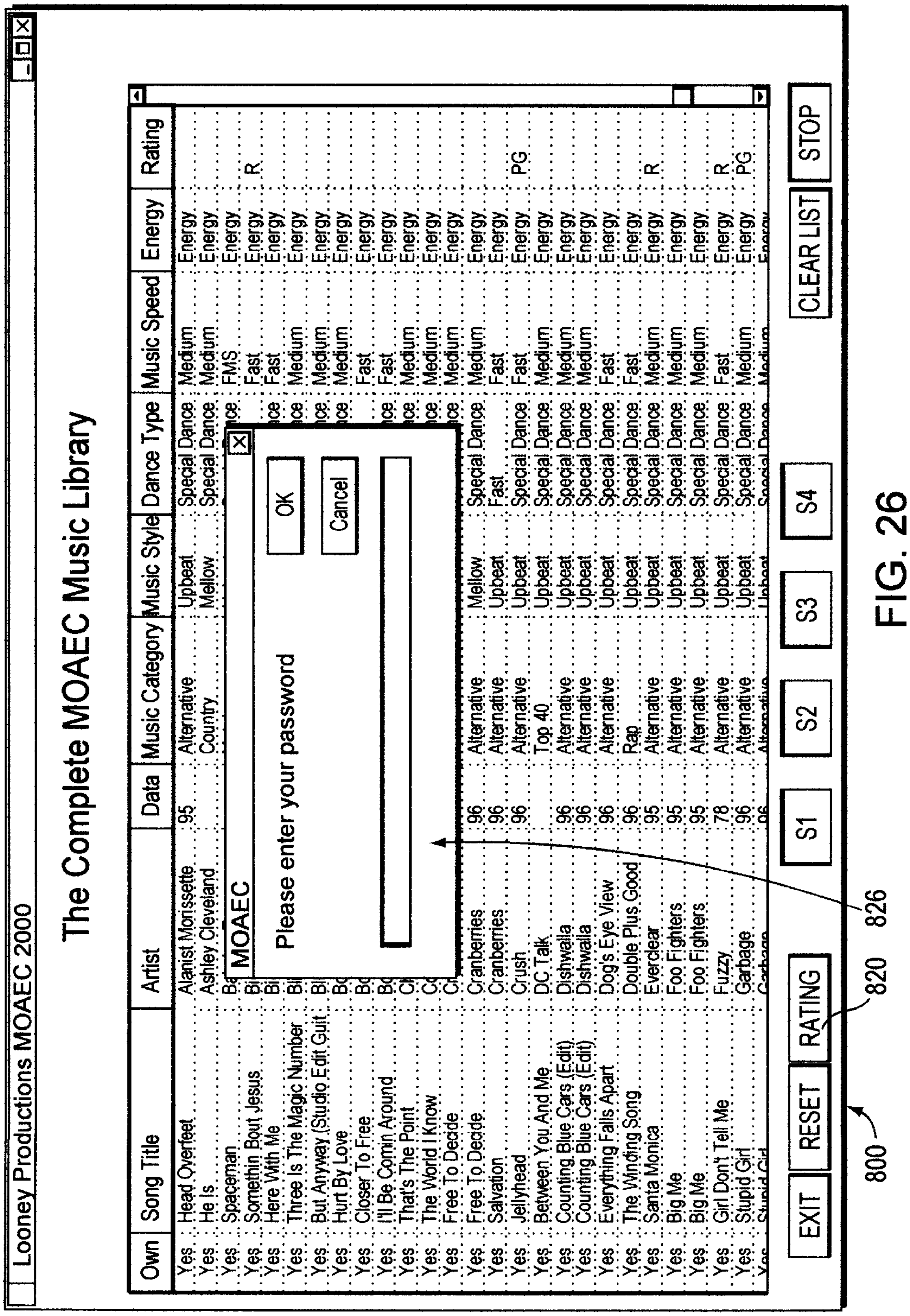
FIG. 26 is a plan view of the graphical user interface screen of FIG. 24 showing a password entry window for retrieving rated music.

FIGS. 24, 25 and 26 detail an alternate view of Screen4, as discussed above. The display 800 includes an overall listing of the selections available from the service provider. A list of over one hundred thousand titles can be included in the MyData database, as selections are delivered from the service provider. The category fields described above are provided for each title 801—namely, artist 802, date of publication 804, specific music category 806 (e.g. "rock," "jazz," "alternative," etc.), music style 808, dance type 810, music speed 812 and energy 814. In addition, an ownership column 816 is provided that indicates whether the music data accompanying the title is present in the users own database. If so, the entry states "yes," otherwise a "no" indication is provided to the column 816 next to the particular title. In addition a rating column 818 is now provided with an appropriate entry field in the database. In this example songs that the service provider may not think are suitable for certain listeners due to content are appended with a rating, as appropriate. In this example, all songs not rates are acceptable to all. A specific rating letter such as "G" can also be placed next to such songs in the column 818. Higher rated songs can include the rating letter PG, or stronger rating letter R, on their particular title row. The depicted ratings are exemplary only. The actual song titles shown should not be taken to have these actual ratings. The music selection list of Screen2 would also display ratings when they are used. Note that a variety of levels of rating and rating criteria can be used. In general such ratings are defined and appended to individual songs be the service provider.

FIG. 25 illustrates the activation of Screen4's rating button 820. This button calls a window 822 that prompts the blocking of R and/or PG-rated songs. In this manner, higher rated song titles cannot be viewed or played. This function is enable and disabled using a password that is entered after striking the password button 824 in the window 822. This button calls a password-entry window 826, detailed in FIG. 26. Once an initial password is entered, it must be reentered to change the rating blocking function or to change the password itself.

Figure 27:
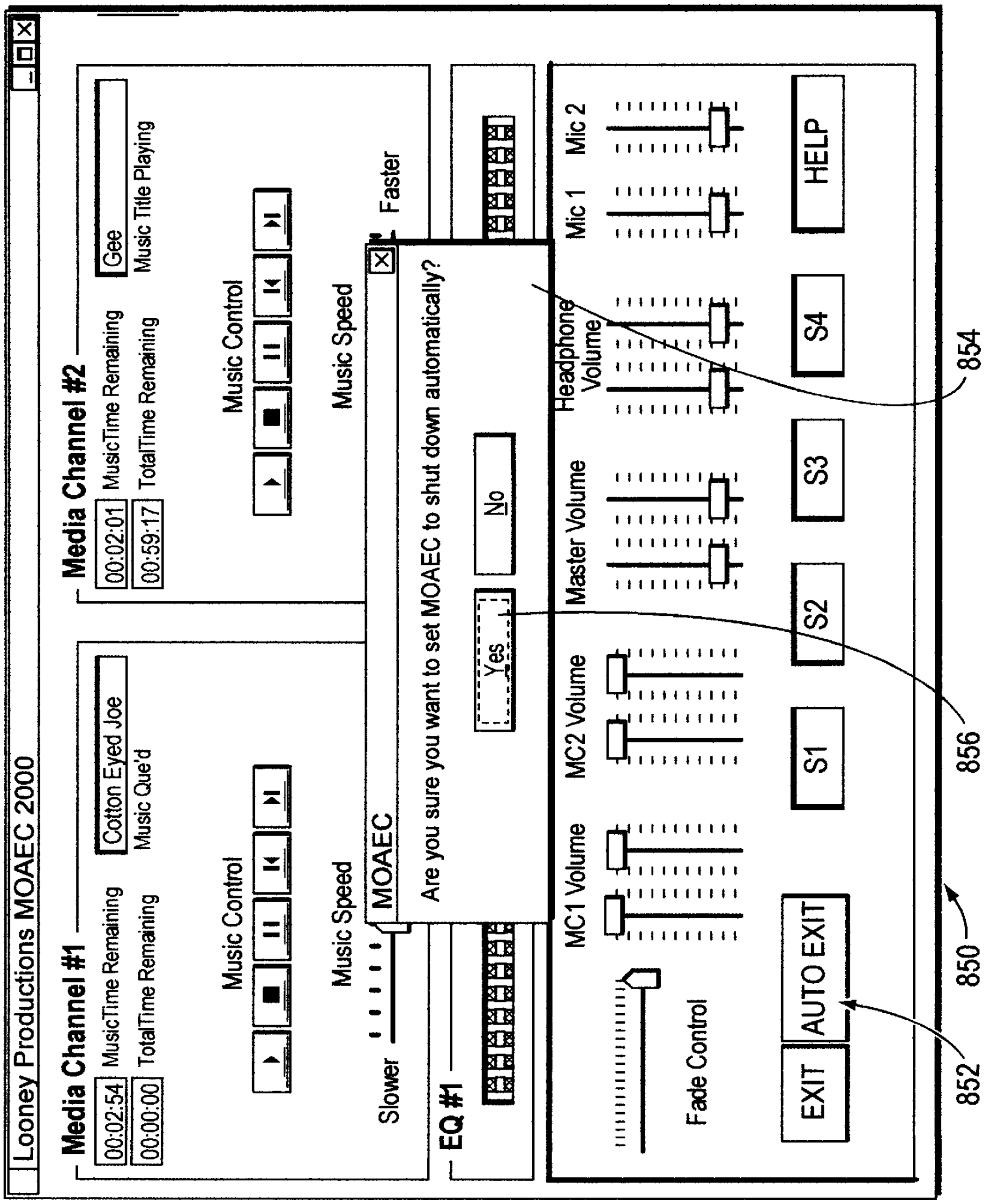
FIG. 27 is a plan view of a modified first graphical user interface screen according to another embodiment of the invention, including an auto-exit function.
Figure 28:
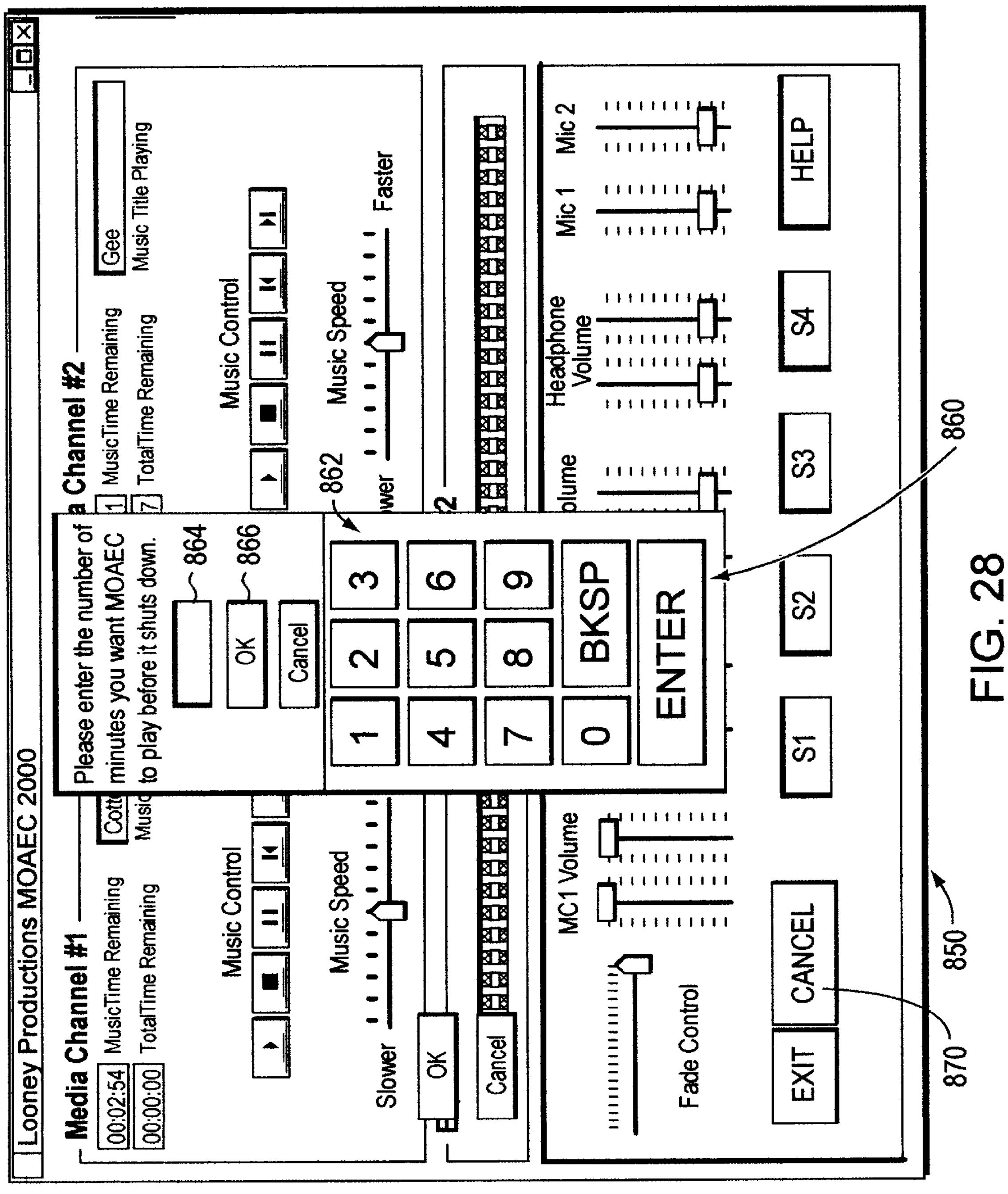
FIG. 28 is a plan view of the graphical user interface screen of FIG. 27 showing a shut-down time control window.

FIGS. 27 and 28, finally, illustrate an auto-exit option appended to the display 850 of Screen1 in this embodiment. An auto-exit button 852 can be clicked to call an automatic shut-down window 854. By clicking a "yes" button 856 in this window, the center calls another window (FIG. 28) with an auto-shutdown keyboard 860. The window 860 includes a numeric keyboard 862 for entering shutdown time in minutes. A time box 864 indicates the selected time. Pressing the "OK" button 866 causes the shutdown time to be acted upon. Playback will occur until the time has been elapsed. At any time, the cancel button 870 can be activated to cause the shutdown routine to cease and/or the window 860 to be removed from Screen1.

The architecture and database storage techniques, as well as the various graphical user interface functions described above can be readily adapted to handle images and full motion video as well. The primary addition to the above-described embodiments would be a screen capable of playing back video of appropriate size interconnected to the center's processor by an appropriate video driver card that is typically commercially available. In addition, appropriate data compression/decompression routines applicable to full motion video and/or images is desirable. In substance, the data for video packages is stored with various categories similar to or the same as those applicable to music described above. The graphical user interface is organized identically, as is control and manipulation of playback. In the case of music videos, most or all of the same categories as music can be used, with the addition, perhaps of certain video-specific categories.

A sufficiently large hard-drive can be used to store a large database of movies and/or other video data. Where storage is problematic, one example contemplates that the center's processor can interface with a commercially available, multi-disc CD-ROM or DVD (Digital Versatile/Video Disc) drive. The drive is interfaced to the processor using commercially available interface hardware. The raw video data can be retrieved as needed from the play-ready optical discs according to a request by the user entered via the MyData database which carries the underlying video category data associated with each video title in its list. Any titles not currently held in the optical unit, can trigger a load-optical-disc message, prompting the user to load-in the optical disc containing the desired date. Of course, this is only one example of a system that handles video data using the underlying interface and organizational structure of the present invention.

Note that the graphical user interface herein has been described in terms of its primary functions. Any buttons on the display screens detailed herein not expressly described can be assumed to perform functions that are straightforward, and particularly noted on the buttons themselves, such as "OK" and "Cancel." All functions not specifically described should be clear to those of ordinary skill.

The foregoing has been a detailed description of a preferred embodiment of the invention. Various modifications and additions can be made without departing from the spirit and scope of this invention. For example, a variety of colors can be used for different keys and buttons, categories can be identified based on certain colors. Voice recognition and voice-playback functions can be provided to any of the embodiments described herein. Various interface devices can be used, such as touch screens, light pens and the like. In addition, the database, data compression and playback systems and software described herein can be substituted for any other acceptable system or software. The particular layout the graphical displays and content of various buttons in the display can also be varied. Again, it is expressly contemplated that particular category buttons on Screen2 are displayed in different colors, and that specific colors can be used to highlight certain windows or underlying selections in a display, as well as the status of various functions. Accordingly, this description is meant to be taken only by way of example and not to otherwise limit the scope of the invention.

What is claimed is:

1. A music organizer and entertainment center comprising:

- a storage device for storing compressed data defining a plurality of individual music selections and associated category flags;
- a processor that retrieves selections and the associated category flags from the storage device based upon user selection of predetermined of the categories;
- a data decompressor that translates the compressed data into playable digital music data;
- a network interface for receiving the compressed data from a remote source over a network for download into the storage device; and
- a graphical user interface display having a plurality of selectable screens, at least one of the selectable screens including a plurality of category buttons constructed and arranged so that when a predetermined of the category buttons is activated, music selections having category flags matching the predetermined category of a respective of the buttons are selected and listed on the display.

2. The center as set forth in claim 1 further comprising a data reading device that transfers data to the data storage device, the data reading device receiving data from a service provider that appends predetermined associated category flags to each of the plurality of individual music selections as originally prepared by the service provider.

3. The center as set forth in claim 2 wherein the data reading device comprises an optical disc reader that reads an optical disc of individual music selections prepared by the service provider.

4. The center as set forth in claim 3 wherein the storage device includes a file having all individual music selections available from the service provider, constructed and arranged so that a user can identify each of the individual music selections whereby the individual music selections can be requested from the service provider.

5. The center as set forth in claim 4 wherein one of the category flags comprises an ownership category flag that indicates which music selections from the list of all music selections are currently resident in the storage device.

6. The center as set forth in claim 1 wherein at least one of the displays includes a play list of music selections chosen from the search list, the center being constructed and arranged to translate compressed data of each of the music selections on the play list, in a predetermined order, and to convert the playable digital music data into audible music signals.

7. The center as set forth in claim 6 further comprising a memory function constructed and arranged to memorize predetermined lists of music selections for subsequent playback based upon predetermined list identifier commands.

8. The center as set forth in claim 7 wherein at least one of the category flags comprises a rating flag and further comprising means for selectively blocking playback of songs associated with predetermined rating flags, the means for blocking including a password entry function to control the means for blocking.

9. The center as set forth in claim 1 further comprising a display screen having a plurality of graphical user interface displays, at least one of the displays including a plurality of buttons that, when activated, display a list of music selections on a search list having the associated category flags.

10. The center as set forth in claim 9 wherein each of the category buttons is constructed and arranged to display a plurality of sub-category buttons with other associated category flags whereby activation of the sub-category buttons further defines a selection of individual music selections so that the further defined music selections have each of the selected associated category flags.

11. The center as set forth in claim 1 further comprising a graphical user interface having a plurality of display screens, at least one of the screens showing thereon a plurality of buttons associated with individual of the associated category flags, a playback list showing music selections schedule for playback by the center and a search list showing current music selections retrieved based upon predetermined of the category buttons.

12. The center as set forth in claim 1 wherein the compressed data is encrypted according to a predetermined encryption format requiring a unique decryption key and wherein the center includes a decryptor including the predetermined key for enabling decryption of the compressed data.

13. The center as set forth in claim 1, wherein one of the category buttons is cross-referenced within the storage device with respect to each individual selection.

14. The center as set forth in claim 1, wherein one of the categories includes sub-categories.

15. A computer readable medium that contains program instructions for:

receiving compressed data representative of a plurality of musical selections from a source;

storing the compressed data in a database with a plurality of category markers associated therewith representative of a plurality of predetermined characteristics of each of the musical selections, respectively;

selectively accessing predetermined of the plurality of selections and constructing a list of the selections for playback as music based upon at least one of the predetermined characteristics entered by a user;

decompressing and playing back each of the predetermined of the plurality of selections according to a desired order of playback; and displaying in a graphical user interface display having a plurality of selectable screens, at least one of the selectable screens including a plurality of category buttons constructed and arrayed so that when a predetermined of the category buttons is activated, music selections having category flags matching the predetermined category of a respective of the buttons are selected and listed on the display.

16. The computer readable medium as set forth in claim 15 wherein the step of receiving includes downloading the compressed data from a network.

17. The computer readable medium as set forth in claim 16 further comprising the step of de-encrypting the compressed data according to a predetermined decryption protocol.

18. The computer readable medium as set forth in claim 16 wherein the step of decompressing includes employing an MPEG3 format.

* * * * *

UNITED STATES PATENT AND TRADEMARK OFFICE

CERTIFICATE OF CORRECTION

PATENT NO. : 6,232,539 B1
DATED : May 15, 2001
INVENTOR(S) : Brian M. Looney et al.

It is certified that error appears in the above-identified patent and that said Letters Patent is hereby corrected as shown below:

Title page,
References Cited, insert the following after "5,740,134 4/1998 Peterson.......369/30":
-- 5,636,276 3/1997 Brugger 705/54

FOREIGN PATENT DOCUMENTS

| | | |
|---|---|---|
| 9848532 | 10/1998 | WO |
| 9617451 | 6/1996 | WO |
| 2305339 | 4/1997 | GB |
| 9908193 | 2/1999 | WO |
| 9318465 | 9/1993 | WO |
| 9612258 | 4/1996 | WO |

OTHER DOCUMENTS
"Multimedia Audio on Demand", an IBM Technical Disclosure Bulletin, vol. 37, no. 6B, 1 June 1994 (1994-06-01) --

Signed and Sealed this

Twenty-eighth Day of May, 2002

*Attest:*

JAMES E. ROGAN
*Director of the United States Patent and Trademark Office*

*Attesting Officer*